(12) United States Patent
Chen et al.

(10) Patent No.: US 12,158,063 B2
(45) Date of Patent: Dec. 3, 2024

(54) METHODS AND SYSTEMS FOR PREDICTING RISK OF EARLY-SCREEN-OUT IN NEAR-WELL ZONE BASED ON DISTRIBUTED FIBER ACOUSTIC SENSING (DAS)

(71) Applicant: SOUTHWEST PETROLEUM UNIVERSITY, Sichuan (CN)

(72) Inventors: Xiyu Chen, Chengdu (CN); Jingze Li, Chengdu (CN); Yongming Li, Chengdu (CN); Tai Chang, Chengdu (CN); Le He, Chengdu (CN); Juhui Zhu, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 0 days.

(21) Appl. No.: 18/541,285

(22) Filed: Dec. 15, 2023

(65) Prior Publication Data

US 2024/0200432 A1 Jun. 20, 2024

(30) Foreign Application Priority Data

Dec. 15, 2022 (CN) .......................... 202211609638.6

(51) Int. Cl.
E21B 43/26 (2006.01)
E21B 47/06 (2012.01)

(52) U.S. Cl.
CPC .............. *E21B 43/26* (2013.01); *E21B 47/06* (2013.01); *E21B 2200/20* (2020.05)

(58) Field of Classification Search
CPC ....... E21B 43/26; E21B 47/06; E21B 2200/20
See application file for complete search history.

(56) References Cited

FOREIGN PATENT DOCUMENTS

| CN | 107194068 A | * | 9/2017 | .............. E21B 43/26 |
| CN | 110580401 A | * | 12/2019 | |

(Continued)

OTHER PUBLICATIONS

Zheng, Bintao et al., Analysis and Strategy Research on Sand Plug of Gas Well Fracturing in YQ Prospect Area, Complex Hydrocarbon Reservoirs, 3(1): 70-72&76, 2010.

*Primary Examiner* — Isam A Alsomiri
*Assistant Examiner* — Abdallah Abulaban
(74) *Attorney, Agent, or Firm* — Porus IP LLC

(57) ABSTRACT

A method for predicting a risk of early screen-out in a near-well zone based on distributed fiber acoustic sensing (DAS) is provided. The method comprises: obtaining an acoustic signal during a fracturing process based on distributed optical fibers deployed in a well to be fractured, and obtaining pressure monitoring data based on at least one sensor deployed in the well to be fractured; determining, based on a location of a perforation cluster, and an acoustic signal of the perforation cluster, fracturing fluid flow velocity data of the perforation cluster by a first predetermined algorithm; determining, based on the fracturing fluid flow velocity data of the perforation cluster and perforation parameters of the perforation cluster, a perforation friction resistance pressure drop of the perforation cluster by a second predetermined algorithm; determining a near-well friction resistance pressure drop of the perforation cluster based on a fluid pressure, the perforation friction resistance pressure drop, a slit fluid pressure; determining a near-well friction resistance coefficient of the perforation cluster based on the near-well friction resistance pressure drop of the perforation cluster; and determining, based on the near-well friction resistance coefficient, whether the perforation cluster has the risk of early screen-out in the near-well zone.

5 Claims, 8 Drawing Sheets

(56) References Cited

FOREIGN PATENT DOCUMENTS

| | | | | |
|---|---|---|---|---|
| CN | 210483704 U | * | 5/2020 | ............. E21B 47/00 |
| CN | 112240195 A | | 1/2021 | |

* cited by examiner

200

- 210 Obtaining an acoustic signal during a fracturing process based on distributed optical fibers deployed in a well to be fractured, and obtaining pressure monitoring data at a location of a perforation cluster based on at least one sensor deployed in the well to be fractured

- 220 Determining, based on the location of the perforation cluster, and the acoustic signal of the perforation cluster, fracturing fluid flow velocity data of the perforation cluster by a first predetermined algorithm

- 230 Determining, based on the fracturing fluid flow velocity data of the perforation cluster and perforation parameters of the perforation cluster, a perforation friction resistance pressure drop of the perforation cluster by a second predetermined algorithm

- 240 Obtaining slit fluid pressure data of the perforation cluster, the slit fluid pressure data of the perforation cluster being determined based on the fracturing fluid flow velocity data of the perforation cluster

- 250 Determining actual fluid pressure data of the location of the perforation cluster in the well to be fractured based on the pressure monitoring data and wellbore friction resistance

- 260 Determining a near-well friction resistance pressure drop of the perforation cluster based on the actual fluid pressure data, the perforation friction resistance pressure drop, and the slit fluid pressure data

- 270 Determining a near-well friction resistance coefficient of the perforation cluster based on the near-well friction resistance pressure drop of the perforation cluster

- 280 Determining, based on the near-well friction resistance coefficient, whether the perforation cluster has a risk of early screen-out in a near-well zone

- 290 In response to a determination that the perforation cluster has the risk early screen-out in the near-well zone, generating a warning message and sending the warning message to a user terminal

FIG. 2

METHODS AND SYSTEMS FOR PREDICTING RISK OF EARLY-SCREEN-OUT IN NEAR-WELL ZONE BASED ON DISTRIBUTED FIBER ACOUSTIC SENSING (DAS)

CROSS-REFERENCE TO RELATED APPLICATIONS

This application claims priority of the Chinese Patent Application No. 202211609638.6, filed on Dec. 15, 2022, the entire contents of which are hereby incorporated by reference.

TECHNICAL FIELD

The present disclosure relates to the field of oil and gas extraction, and in particular, to a method and a system for predicting a risk of early screen-out in near-well zone based on distributed fiber acoustic sensing (DAS).

BACKGROUND

The multi-stage hydraulic fracturing in horizontal well is the main technology for production enhancement in developing unconventional oil and gas reservoirs. During the fracturing process, sand-carrying fluids erode the near-well zone of some fractures and weaken their tortuosity, reducing frictional resistance and increasing fluid intake, thus improving connectivity in the near-well zone. But in some times, the proppant may accumulate in some fractures, causing early screen-out in the near-well zone, which in turn increases frictional resistance and reduces fluid intake, resulting in a gradual intensifying tortuosity of fracture in the near-well zone. In order to evaluate the connectivity in the near-well zone and extents of fracture development during multi-stage hydraulic fracturing, the fracture propagation is usually monitored by some monitoring techniques such as chemical tracers, micro-seismic. However, the accuracy of the above monitoring methods is insufficiency, which may only make a rough estimation of the fluid distribution among clusters and the fracture propagations, making it difficult to predict the risk of early screen-out in near-well zone of the fractures.

Therefore, it is desirable to provide a method and a system for predicting a risk of early screen-out in a near-well zone based on DAS. The proposed method can help assess the connectivity in the near-well zone of fractures for each perforation cluster, and predict the risk of early screen-out with a relatively high accuracy.

SUMMARY

One or more embodiments of the present disclosure provide a method for predicting a risk of early screen-out in a near-well zone based on distributed fiber acoustic sensing (DAS). The method may comprise: obtaining an acoustic signal during a fracturing process based on distributed optical fibers deployed in a well to be fractured, and obtaining pressure monitoring data based on at least one sensor deployed in the well to be fractured. The method may also comprise determining, based on a location of a perforation cluster, and an acoustic signal of the perforation cluster, fracturing fluid flow velocity data of the perforation cluster by a first predetermined algorithm. The method may also comprise determining, based on the fracturing fluid flow velocity data of the perforation cluster and perforation parameters of the perforation cluster, a perforation friction resistance pressure drop of the perforation cluster by a second predetermined algorithm. The method may also comprise obtaining slit fluid pressure data of the perforation cluster, the slit fluid pressure data of the perforation cluster being determined based on the fracturing fluid flow velocity data of the perforation cluster. The method may also comprise determining actual fluid pressure data of the location of the perforation cluster in the well to be fractured based on the pressure monitoring data and wellbore friction resistance. The method may further comprise determining a near-well friction resistance pressure drop of the perforation cluster based on the actual fluid pressure data, the perforation friction resistance pressure drop, and the slit fluid pressure data. The method may further comprise determining a near-well friction resistance coefficient of the perforation cluster based on the near-well friction resistance pressure drop of the perforation cluster. The method may further comprise determining, based on the near-well friction resistance coefficient, whether the perforation cluster has the risk of early screen-out in the near-well zone. The method may further comprise in response to a determination that the perforation cluster has the risk of early screen-out in the near-well zone, determining a treatment scheme for the perforation cluster, and generating a warning instruction and/or treatment instruction and sending the warning instruction and/or treatment instruction based on the treatment scheme.

One or more embodiments of the present disclosure provide a system for predicting a risk of early screen-out in the near-well zone based on distributed fiber acoustic sensing (DAS). The system may comprise a non-transitory computer-readable storage medium storing computer instructions that, when executed by a computer, direct the computer to cause the system to: obtain an acoustic signal during a fracturing process based on distributed optical fibers deployed in a well to be fractured, and obtain pressure monitoring data based on at least one sensor deployed in the well to be fractured; determine, based on a location of a perforation cluster, and an acoustic signal of the perforation cluster, fracturing fluid flow velocity data of the perforation cluster by a first predetermined algorithm; determine, based on the fracturing fluid flow velocity data of the perforation cluster and perforation parameters of the perforation cluster, a perforation friction resistance pressure drop of the perforation cluster by a second predetermined algorithm; obtain slit fluid pressure data of the perforation cluster, the slit fluid pressure data of the perforation cluster being determined based on the fracturing fluid flow velocity data of the perforation cluster; determine actual fluid pressure data of the location of the perforation cluster in the well to be fractured based on the pressure monitoring data and wellbore friction resistance; determine a near-well friction resistance pressure drop of the perforation cluster based on the actual fluid pressure data, the perforation friction resistance pressure drop, and the slit fluid pressure data; determine a near-well friction resistance coefficient of the perforation cluster based on the near-well friction resistance pressure drop of the perforation cluster; determine, based on the near-well friction resistance coefficient, whether the perforation cluster has a risk of early screen-out in the near-well zone; and in response to a determination that the perforation cluster has the risk of early screen-out in the near-well zone, determine a treatment scheme for the perforation cluster, and generate a warning instruction and/or treatment instruction and send the warning instruction and/or the treatment instruction based on the treatment scheme.

One or more embodiments of the present disclosure provide a non-transitory computer-readable storage medium storing computer instructions, when executed by at least one processor, the at least one processor may be directed to implement the method for predicting the risk of early screen-out in the near-well zone based on DAS.

BRIEF DESCRIPTION OF THE DRAWINGS

The present disclosure will be further illustrated by way of exemplary embodiments, which will be described in detail with the accompanying drawings. These embodiments are non-limiting. In these embodiments, the same count indicates the same structure, wherein:

FIG. 2 is a flowchart illustrating an exemplary method for predicting a risk of early screen-out in a near-well zone based on DAS according to some embodiments of the present disclosure;

DETAILED DESCRIPTION

Figure 1:
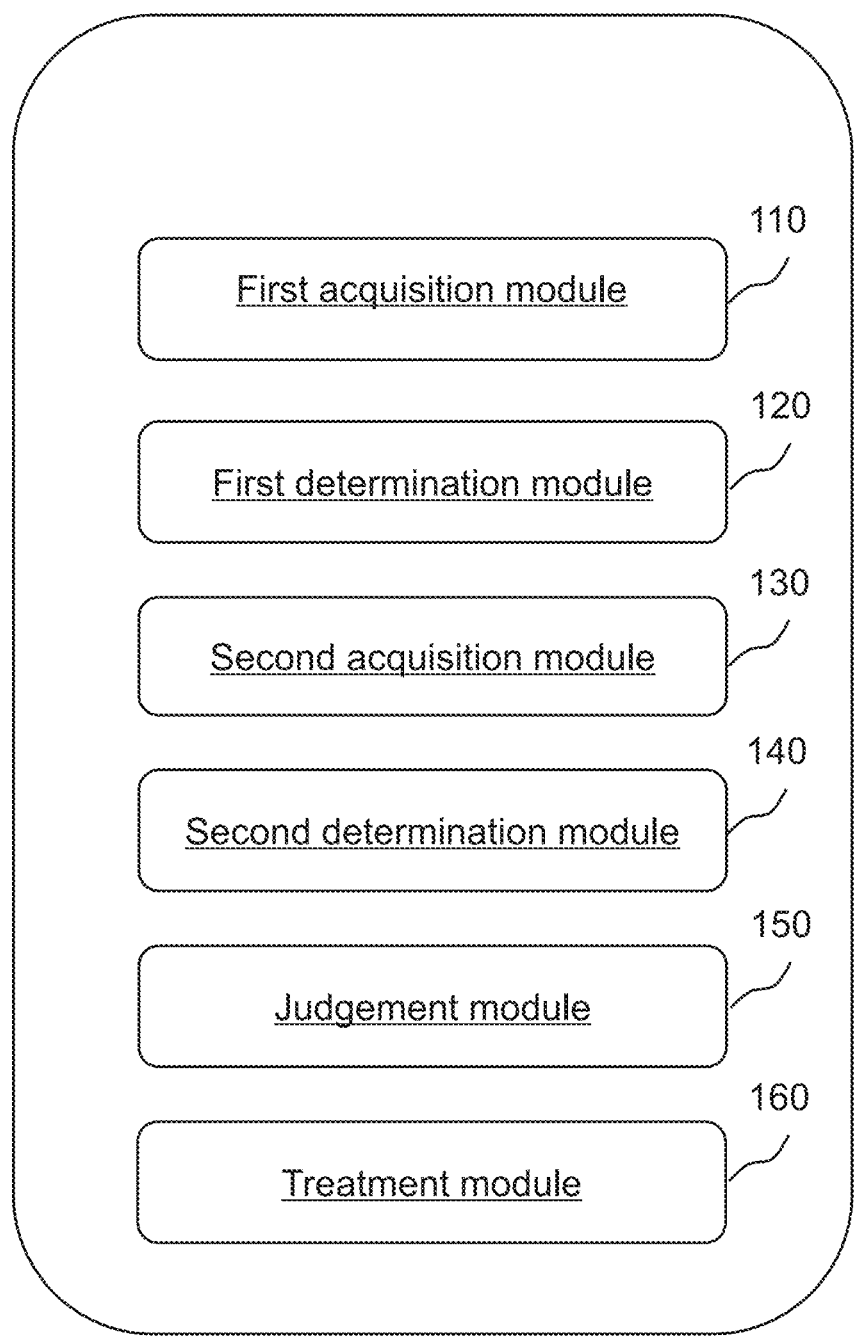
FIG. 1 is a schematic structural diagram illustrating a system for predicting a risk of early screen-out in a near-well zone based on DAS according to some embodiments of the present disclosure.

In order to more clearly illustrate the technical solutions of the embodiments of the present disclosure, the following briefly introduces the drawings that need to be used in the description of the embodiments. Apparently, the accompanying drawings in the following description are only some examples or embodiments of the present disclosure, and those skilled in the art can also apply the present disclosure to other similar scenarios according to the drawings without creative efforts. Unless obviously obtained from the context or the context illustrates otherwise, the same numeral in the drawings refers to the same structure or operation.

It should be understood that "system", "device", "unit" and/or "module" as used herein is a method for distinguishing different components, elements, parts, portions or assemblies of different levels. However, the words may be replaced by other expressions if other words can achieve the same purpose.

As indicated in the disclosure and claims, the terms "a", "an", and/or "the" are not specific to the singular form and may include the plural form unless the context clearly indicates an exception. Generally speaking, the terms "comprising" and "including" only suggest the inclusion of clearly identified steps and elements, and these steps and elements do not constitute an exclusive list, and the method or device may also contain other steps or elements.

The flowchart is used in the present disclosure to illustrate the operations performed by the system according to the embodiments of the present disclosure. It should be understood that the preceding or following operations are not necessarily performed in the exact order. Instead, various steps may be processed in reverse order or simultaneously. Meanwhile, other operations may be added to these procedures, or a certain step or steps may be removed from these procedures.

The multi-stage hydraulic fracturing in the horizontal well is a technology for production enhancement in developing unconventional oil and gas reservoirs. It uses packers to divide the fracturing segments and perform multi-cluster perforation, which may create multiple fracture slits at lower man-hours. Due to the interference of the complex stress field formed by the wellbore and the perforation, each fracture slit exhibits a complex and distorted shape in the near-well region, resulting in frictional resistance to the passed sand-carrying fluid.

However, during the fracturing process of some fracture slits, with accumulation of the proppant in the fracture slits, early screen-out in the near-well zone may occur. The early screen-out in the near-well zone may increase the frictional resistance of the perforation clusters and reduce the fluid intake, which may gradually deteriorate the connectivity in near-well zone, resulting in the inability to uniform reform of the target oil and gas reservoir, and making it difficult to maximize the effect of the production enhancement of multi-stage hydraulic fracturing in the horizontal well in multiple clusters. In addition, serious early screen-out in the near-well zone may result in early termination of the fracturing operation, causing a complete failure of the reservoir reforming operation.

The multi-stage hydraulic fracturing in the horizontal well in multiple clusters may induce the formation of multiple fracture slits simultaneously, the level of tortuosity varies among individual fracture slits in the near-well region, which leads to noticeable differences in frictional resistance, fluid intake, and fracture development rate among the fracture slits in the near-well region and increases the difficulty of predicting the early screen-out in the near-well zone.

Accordingly, some embodiments of the present disclosure provide a method and a system for predicting a risk of early screen-out in a near-well zone based on DAS. By monitoring acoustic signals using distributed optical fiber acoustic sensors, the fluid intake of each perforation cluster may be determined, improving the computational accuracy and reducing the error of geometrical sizes of the fracture slits predicted by a fracture slit extension model. By calculating and analyzing a change trend of a near-well friction resistance coefficient, the risk of the early screen-out in the near-well zone of each perforation cluster may be accurately assessed, thereby providing accurate and reliable decision support for field operators and enhancing the development efficiency of the unconventional oil and gas reservoirs.

FIG. 1 is a schematic structural diagram illustrating a system for predicting a risk of early screen-out in a near-well zone based on DAS according to some embodiments of the present disclosure.

As shown in FIG. 1, the system 100 for predicting the risk of the early screen-out in the near-well zone based on DAS may include a first acquisition module 110, a first determination module 120, a second acquisition module 130, a second determination module 140, a judgement module 150, and a treatment module 160.

The first acquisition module may be configured to obtain an acoustic signal during a fracturing process based on distributed optical fibers deployed in a well to be fractured, and obtain pressure monitoring data based on at least one sensor deployed in the well to be fractured.

The first determination module may be configured to determine, based on a location of a perforation cluster, and an acoustic signal of the perforation cluster, fracturing fluid flow velocity data of the perforation cluster by a first predetermined algorithm; and determine, based on the fracturing fluid flow velocity data of the perforation cluster and perforation parameters of the perforation cluster, a perforation friction resistance pressure drop of the perforation cluster by a second predetermined algorithm.

In some embodiments, the first determining module may be further configured to determine a signal energy distribution range of the location of perforation cluster in the well to be fractured based on the acoustic signal and a depth of the cluster; determine sound energy data of the perforation cluster within the signal energy distribution range; obtain corrected sound energy data of the perforation cluster by correcting the sound energy data of the perforation cluster; and determine the fracturing fluid flow velocity data of the perforation cluster based on the corrected sound energy data of the perforation cluster.

In some embodiments, the first determining module may be further configured to obtain the corrected sound energy data of the perforation cluster within a historical time period based on sound energy data of the perforation cluster within the historical time period by a weighted moving average filter.

In some embodiments, the first determining module may be further configured to determine, based on a proportion of the corrected sound energy data of each perforation cluster, a proportion of the fracturing fluid flow velocity data of each perforation cluster; and determine, based on the proportion of the fracturing fluid flow velocity data of each perforation cluster and a total fracturing fluid displacement, the fracturing fluid flow velocity data of each perforation cluster.

The second acquisition module may be configured to obtain slit fluid pressure data of the perforation cluster, the slit fluid pressure data of the perforation cluster being determined based on the fracturing fluid flow velocity data of the perforation cluster.

The second determination module may be configured to determine the actual fluid pressure at the location of the perforation cluster in the well to be fractured based on the pressure monitoring data and the wellbore friction resistance; determine a near-well friction resistance pressure drop of the perforation cluster based on the actual fluid pressure data, the perforation friction resistance pressure drop, and the slit fluid pressure data; and determine a near-well friction resistance coefficient of the perforation cluster based on the near-well friction resistance pressure drop of the perforation cluster.

In some embodiments, the second determination module may be further configured to determine the near-well friction resistance pressure drop of the perforation cluster based on a difference value obtained by subtracting the perforation friction resistance pressure drop and the slit fluid pressure data from the actual fluid pressure data.

In some embodiments, the second determination module may be further configured to determine the near-well friction resistance coefficient of the perforation cluster based on the near-well friction resistance pressure drop of the perforation cluster, and the fracturing fluid flow velocity data of the perforation cluster.

The judgement module may be configured to determine, based on the near-well friction resistance coefficient, whether the perforation cluster has a risk of early screen-out in a near-well zone.

In some embodiments, the judgement module may be further configured to: in response to a determination that the near-well friction resistance coefficient of the perforation cluster satisfies a first predetermined condition, determine that the perforation cluster has no risk of early screen-out in the near-well zone; in response to a determination that the near-well friction resistance coefficient of the perforation cluster satisfies a second predetermined condition, determine that the perforation cluster has the risk of early screen-out in the near-well zone; and in response to a determination that the perforation cluster has the risk of early screen-out in the near-well zone and a flow of the perforation cluster satisfies a third predetermined condition, determine that the perforation cluster has early screen-out in the near-well zone, and determine a first treatment scheme; and in response to a determination that a count of perforation clusters having early screen-out in the near-well zone satisfies a predetermined count requirement, determine a second treatment scheme.

The treatment module may be configured to in response to a determination that the perforation cluster has the risk of early screen-out in the near-well zone, determine a treatment scheme for the perforation cluster, and generate a warning instruction and/or treatment instruction and send the warning instruction and/or treatment instruction based on the treatment scheme.

In some embodiments, the system 100 for predicting the risk of early screen-out in the near-well zone based on DAS may further include a prediction module (not shown in the figures). The prediction module may be configured to determine, based on the near-well friction resistance coefficient of the perforation cluster within a first time period, geological reservoir distribution of the perforation cluster within a first range, and a fracturing fluid-sand ratio, the risk of early screen-out in the near-well zone of the perforation cluster by a first prediction model, the first prediction model being a machine learning model; and determine, based on the risk of early screen-out in the near-well zone of the perforation cluster, a recommended treatment scheme for the perforation cluster.

More descriptions regarding the first acquisition module 110, the first determination module 120, the second acquisition module 130, the second determination module 140, the judgement module 150, and the treatment module 160 may be found in the relevant descriptions below.

In some embodiments, the first acquisition module 110, the first determination module 120, the second acquisition module 130, the second determination module 140, the judgement module 150, and the treatment module 160 may be integrated in a processor. A process 200 in FIG. 2 may be performed by the processor.

It is to be noted that the above description of the system 100 for predicting the risk of early screen-out in the near-well zone based on DAS and the modules thereof is provided only for descriptive convenience, and does not limit the present disclosure to the scope of the cited embodiments. It is to be understood that for those skilled in the art, after understanding the principle of the system, it may be possible to arbitrarily combine the modules or form a sub-system connected to other modules without departing from the principle. In some embodiments, the first acquisition module 110, the first determination module 120, the second acquisition module 130, the second determination module 140, the judgement module 150, and the judgement module 160 disclosed in FIG. 1 may be different modules of a single system, or a single module realizing the functions of two or more of the modules. For example, the individual modules may share a storage module, and the individual modules may each have a storage module. Such variations are within the scope of protection of the present disclosure.

FIG. 2 is a flowchart illustrating an exemplary method for predicting a risk of early screen-out in a near-well zone based on DAS according to some embodiments of the present disclosure. In some embodiments, the process 200 may be performed by a processor of a system for predicting a risk of early screen-out in a near-well zone based on DAS. As shown in FIG. 2, the process 200 may include the following operations.

In 210, an acoustic signal during a fracturing process may be obtained based on distributed optical fibers deployed in a well to be fractured, and pressure monitoring data may be obtained based on at least one sensor deployed in the well to be fractured.

The distributed optical fibers refer to sensors that measure or monitor space distribution information along an optical fiber transmission path using the distributed optical fiber detection technology.

In some embodiments, the distributed optical fiber detection technology may include measuring temperature, sound, or the like. Correspondingly, the distributed optical fibers may include distributed temperature sensors (DTS) and distributed acoustic sensors (DAS), etc.

In some embodiments, the distributed optical fibers may be installed on an outer side of a production casing or an outer side of a packer tubing column. The distributed optical fibers may be transported to a pre-determined location of the well to be fractured (e.g., a pre-determined location of the perforation cluster) via continuous tubing technology. The well to be fractured refers to a horizontal well that needs hydraulic fracturing construction.

The sensors refer to devices used for measuring pressure at a location of the perforation cluster. For example, the sensor may include a pressure gauge, a pressure transducer, or the like.

In some embodiments, by pre-embedding the distributed optical fibers into a casing or fixing the distributed optical fibers to the outer side of the packer tubing column, a change in the acoustic signal generated by the fracturing fluid and a phase change of an acoustic scattering signal during a fracturing process may be obtained based on the DAS monitoring technology, and acoustic perturbation of the fracturing fluid may be monitored by a signal demodulation and signal recognition algorithm.

The location of the perforation cluster refers to aa predetermined location of the perforation cluster. For example, the location of the perforation cluster may include a depth of the perforation cluster in the well to be fractured, etc.

In some embodiments, perforation device may be respectively delivered to predetermined locations of a number of perforation segments downhole for fracturing to obtain a plurality of perforation clusters of a number of perforation segments. The perforation devices may include a perforation gun, a perforator, or the like.

In some embodiments, the processor may obtain the location of the perforation cluster based on a construction schedule.

The acoustic signal refers to acoustic information generated by a fluid in a wellbore during fracturing construction. Wherein, the fluid may include a fracturing fluid, a sand-carrying fluid, or the like. The fracturing fluid refers to a fluid used for perforation pressurization. The sand-carrying fluid refers to a mixed fluid formed by stirring gravels and proppants.

In some embodiments, the acoustic signal refers to a sequence including acoustic data at different times.

The acoustic data refers to a sampled value of the acoustic signal corresponding to a certain time.

In some embodiments, the processor may acquire the acoustic signal based on the distributed optical fiber acoustic sensors deployed at the location of the perforation cluster during the process of fracturing construction.

The pressure monitoring data is used to characterize a pressure monitoring value in the wellbore over time.

In some embodiments, the pressure monitoring data refers to a sequence including pressure monitoring values at different times. The pressure monitoring values refer to detected values of pressure in the wellbore.

In some embodiments, the processor may obtain the pressure monitoring data based on pressure sensors deployed at a wellhead during the fracturing construction.

In some embodiments, the processor may obtain a geological reservoir distribution and engineering parameters of the well to be fractured before or during the fracturing construction.

In some embodiments, the processor may determine the geological reservoir distribution based on detection data of at least one geological sample. The geological sample refers to a result of geological sampling at different sampling locations within a predetermined region of the well to be fractured.

The detection data refer to a result of measuring and analyzing the geological sample.

In some embodiments, the processor may obtain the detection data by detecting the geological sample using a detection device. The detection device is a tool used to measure and analyze the geological sample. For example, the detection device may include a geological detection instrument.

The geological reservoir distribution is characteristic related to a hydrocarbon reservoir of the well to be fractured. The geological reservoir distribution may include a reservoir distribution range, an effective reservoir permeability, a reservoir thickness, a reservoir formation pressure, reservoir fluid properties (e.g., density, viscosity, compression coefficient, and total mineralization, etc.), and rock mechanical properties (e.g., elasticity modulus, Poisson's ratio, compressive strength, etc.).

The predetermined region is a geographic region within a specific distance of the location of the well to be fractured. In some embodiments, the predetermined region may be a regularly shaped geographic extent or an irregularly shaped geographic extent.

The sampling location is a location where the geologic sample is taken.

In some embodiments, geologic samples of the sampling locations may be obtained based on the predetermined region and sample at predetermined intervals.

In some embodiments, the processor may determine the geological reservoir distribution based on the detection data of a number of geologic samples and corresponding collection locations using a geological modeling technique. The geological modeling technique includes, but is not limited to, Kriging, a voxel model, a Gaussian process, multi-point simulation, or the like.

The engineering parameters are predetermined parameters of the fracturing construction process. For example, the engineering parameters may include fracturing parameters, construction equipment parameters, parameters of the well to be fractured, or the like.

The fracturing parameters are parameters related to fracturing. For example, the fracturing parameters may include a fracturing sequence of each perforation cluster, a type of fracturing fluid, a flow rate of the fracturing fluid, a pressure of the fracturing fluid, a fracturing fluid-sand ratio, a type of proppant, or the like. The fracturing fluid-sand ratio refers to a ratio of a volume of a proppant sand stack to a volume of sand-carrying fluid.

The construction equipment parameters are predetermined parameters used by construction equipment during the fracturing construction process. For example, the construction equipment parameters may include a sand filling pressure, a pump stopping pressure, a well shut-in pressure, power of the fracturing equipment, a pressure limit of the fracturing equipment, etc.

The parameters of the well to be fractured are parameters related to the well to be fractured. For example, the parameters of the well to be fractured may include a type of the well to be fractured, a well diameter of the well to be fractured, a count of fracturing segments, locations of the fracturing segments, etc.

In some embodiments, the processor may obtain the engineering parameters in various ways. For example, the processor may obtain the engineering parameters through manual input. As another example, the processor may obtain the engineering parameters from a storage device or a database.

In some embodiments, the processor may also preset a comparison table of different geological information with different engineering parameters and obtain the engineering parameters by looking up the table.

By obtaining the geological information and the engineering parameters, the fracturing construction process can be accurately controlled, thereby improving the quality and efficiency of hydraulic fracturing construction.

In 220, fracturing fluid flow velocity data of the perforation cluster may be determined based on a location of a perforation cluster, and an acoustic signal of the perforation cluster by a first predetermined algorithm.

The fracturing fluid flow velocity data may reflect a change in a fracturing fluid flow rate over time at the location of the perforation cluster. For example, the fracturing fluid flow velocity data may be a sequence including fracturing fluid flow rates at different times in a chronological order.

The fracturing fluid flow rate refers to a flow rate value of the fracturing fluid flowing through the perforation cluster.

In some embodiments, the fracturing fluid flow velocity data refers to a sequence including fracturing fluid flow rates within different predetermined time periods in a chronological order.

The first predetermined algorithm is an algorithm configured to determine the fracturing fluid flow velocity data of the perforation cluster. For example, the first predetermined algorithm may be a predetermined formula or mapping relationship.

The perforation cluster refers to a group of perforations in a particular fracturing segment. The fracturing segment refers to a section of horizontal well that needs perforation.

In some implementations, the processor may determine the fracturing fluid flow velocity data of the perforation cluster by analyzing and processing the acoustic signal of each perforation cluster based on modeling or various data analysis algorithms, such as regression analysis, etc.

In some implementations, the processor may determine, based on the acoustic signal and a depth of the perforation cluster, a signal energy distribution range at the location of the perforation cluster in the well to be fractured; determine sound energy data of the perforation cluster within the signal energy distribution range in a predetermined time period; obtain corrected sound energy data of the perforation cluster by correcting the sound energy data of the perforation cluster; and determine the fracturing fluid flow velocity data of the perforation cluster based on the corrected sound energy data of the perforation cluster.

The signal energy distribution refers to an energy distribution of the acoustic signal with frequency at the location of the perforation cluster.

The signal energy distribution range refers to a change range of energy of the acoustic signal. For example, the signal energy distribution range may be a numerical interval consisting of maximum and minimum values of the energy of the acoustic signal.

In some embodiments, the processor may determine the signal energy distribution range at the location of the perforation cluster in the well to be fractured in various ways. For example, the processor may determine the location of the perforation cluster based on the depth of the perforation cluster; obtain the acoustic signal at the location of the perforation cluster based on the distributed optical fibers deployed at the location; calculate a square value of acoustic data of the acoustic signal at the location of the perforation cluster at each time to determine an energy value of the acoustic signal at the location of the perforation cluster at each time; and determine the signal energy distribution range at the location of the perforation cluster based on the energy value at each time.

The predetermined time period refers to a predetermined short time range. For example, the predetermined time period may be a time period of seconds, such as 5 s or 10 s. The shorter the predetermined time period, the finer the granularity of the corresponding data.

In some embodiments, the processor may obtain a plurality of predetermined time periods by dividing time of an acoustic signal, such as the first predetermined time period, a second predetermined time period, and so on.

The time of the acoustic signal refers to a time period from a start time to an end time of the acoustic signal.

The division may be performed based on preset time duration, equal interval division, or another method of division. The preset time duration may be a manually preset value, a system default value, or the like.

The sound energy data refers to a sequence composed of sound energy of the perforation cluster at different preset time periods.

The sound energy refers to an energy value of the acoustic signal of the perforation cluster during a certain preset time period.

In some embodiments, the processor may calculate the sound energy of each perforation cluster in various ways. For example, for each perforation cluster, the processor may, based on the acoustic signal of the perforation cluster in a certain predetermined time period, calculate a sum of the energy value within signal energy distribution range as the sound energy of the perforation cluster in the predetermined time period.

The corrected sound energy data refers to a sequence composed of corrected sound energy of the perforation cluster within different predetermined time periods.

The corrected sound energy refers to sound energy after correction treatment.

The correction treatment refers to a process of correcting and adjusting the acoustic signal to improve the quality of the acoustic signal, remove noise, etc.

In some embodiments, for each perforation cluster, the processor may obtain the corrected sound energy data of the perforation cluster by performing the correction treatment on the sound energy of the perforation cluster within each predetermined time period. The correction treatment may include a moving average method, a moving filter, or the like.

In some embodiments, the processor may obtain the corrected sound energy data of the perforation cluster within a historical time period based on the sound energy data of the perforation cluster within the historical time period by a weighted moving average filter.

The historical time period is a time period prior to present time. For example, the historical time period may be the past day, week, and so on.

In some embodiments, the historical time period may include a plurality of predetermined historical time periods. Each of the plurality of predetermined historical time periods may correspond to a segment of sound energy. In some embodiments, durations of the plurality of predetermined historical time periods may be the same or different.

The weighted moving average filter refers to a filter that corrects sound energy within a subsequent historical preset time period based on sound energy within a previous historical preset time period.

In some embodiments, for each perforation cluster, the processor may determine a plurality of candidate sound energies of the sound energy of the perforation cluster within the predetermined historical time period based on the sound energy data of the perforation cluster in each of the plurality of predetermined historical time periods, and determine corrected sound energy of the perforation cluster within the predetermined historical time period based on a weighted sum of the plurality of candidate sound energies. The candidate sound energies refer to sound energies of a predetermined count of predetermined historical time periods prior to a target predetermined historical time period. The target predetermined historical time period is a predetermined historical time period that requires the correction treatment.

The predetermined count and weighted weights may be determined through experimentation or experience.

For example, the processor may determine the corrected sound energy data of the perforation cluster in the historical time period based on equation (1).

$$T_i^{t+1} = \frac{aS_i^t + bS_i^{t-1} + cS_i^{t-2}}{a+b+c};\qquad(1)$$

Where $T_i^{t+1}$ denotes corrected sound energy of an ith perforation cluster within a (t+1)th predetermined historical time period, $S_i^t$ denotes sound energy of the ith perforation cluster within a tth predetermined historical time period, $S_i^{t-1}$ denotes sound energy of ith perforation cluster within a (t−1)th predetermined historical time period, and $S_i^{t-2}$ denotes sound energy of ith perforation cluster within a (t−2)th predetermined historical time period; and a, b, and c denote weights corresponding to the predetermined historical time periods, respectively.

In some embodiments, the weights a, b, and c may be determined based on experimentation or experience.

In some embodiments of the present disclosure, noise in the acoustic signal may be suppressed by the weighted moving average filter, thereby extracting useful information, removing the interference, and improving the quality of the acoustic signal.

In some embodiments, for each perforation cluster, the processor may determine the fracturing fluid flow velocity data of the perforation cluster based on the corrected sound energy data of the perforation cluster in various ways. For example, the processor may determine the fracturing fluid flow velocity data of the perforation cluster based on the corrected sound energy data of the perforation cluster by various approaches such as vector matching, software simulation, or the like.

In some embodiments of the present disclosure, the higher-quality corrected sound energy can be obtained by performing the correction treatment on the sound energy data, which is conducive to improving the accuracy of calculating the fracturing fluid flow velocity data, and facilitating subsequent determination on the risk of early screen-out in the near-well zone.

In some embodiments, the processor may determine, based on a proportion of the corrected sound energy data of each perforation cluster, a proportion of the fracturing fluid flow velocity data of each perforation cluster; and determine, based on the proportion of the fracturing fluid flow velocity data of each perforation cluster and a total fracturing fluid displacement, the fracturing fluid flow velocity data of each perforation cluster.

The proportion of the corrected sound energy refers to a proportion of the corrected sound energy of a certain perforation cluster to the corrected sound energy of all the perforation clusters within a certain predetermined time period.

The proportion of the fracturing fluid flow velocity refers to a ratio of a fracturing fluid flow velocity of a certain perforation cluster to a sum of fracturing fluid flow velocities of all the perforation clusters within a certain predetermined time period.

The total fracturing fluid displacement refers to a volume or mass of fracturing fluid flowing through a wellbore within a certain predetermined time period.

In some embodiments, the processor may obtain the total fracturing fluid displacement through a flow meter deployed in the wellbore.

In some embodiments, the sum of the fracturing fluid flow velocities of all the perforation clusters within a certain predetermined time period may be equal to the total fracturing fluid displacement.

In some embodiments, for each predetermined time period, the processor may directly determine the proportion of the corrected acoustic energy of each perforation cluster within the predetermined time period as the proportion of the fracturing fluid flow velocity of each perforation cluster within the predetermined time period. The processor may determine, based on the proportion of the fracturing fluid flow velocity of each perforation cluster within the predetermined time period, and the sum of the fracturing fluid flow velocities of all the perforation clusters, the fracturing fluid flow velocity of each perforation cluster within the predetermined time period. The processor may determine, based on the fracturing fluid flow velocity within each predetermined time period, the fracturing fluid flow velocity data of each perforation cluster.

Merely by way of example, the processor may determine the fracturing fluid flow velocity data of the perforation cluster based on equation (2), equation (3), and equation (4).

$$\frac{q_j}{q_k} = \frac{T_j}{T_k}, j, k \in 1, 2, \ldots N; \quad (2)$$

$$q_1 + q_2 + q_3 + \ldots + q_N = Q; \quad (3)$$

$$q_i = \frac{T_i Q}{T_1 + T_2 + \ldots + T_{N-1} + T_N}, i = 1, 2, 3, \ldots N; \quad (4)$$

Where $q_i$ denotes a fracturing fluid flow velocity of an ith perforation cluster within a certain predetermined time period, $q_j$ denotes a fracturing fluid flow velocity of a jth perforation cluster within the certain predetermined time period, $q_k$ denotes a fracturing fluid flow velocity of a kth perforation cluster within the certain predetermined time period, Tj denotes corrected sound energy of a jth perforation cluster within the certain predetermined time period, and $T_k$ denotes corrected sound energy of a kth perforation cluster within the certain predetermined time period; N denotes a count of perforation clusters in a fracturing segment; and Q denotes a total fracturing fluid displacement within the certain predetermined time period.

In some embodiments of the present disclosure, the fracturing fluid flow velocity data of each perforation cluster may be quickly determined by determining the proportion of the fracturing fluid flow velocity based on the proportion of the corrected sound energy, which is conducive to saving the computational resources of the system and improving the computational efficiency of the system.

In 230, a perforation friction resistance pressure drop of the perforation cluster may be determined based on the fracturing fluid flow velocity data of the perforation cluster and perforation parameters of the perforation cluster by a second predetermined algorithm.

The perforation parameters are parameters related to a perforation hole and fracturing fluid flowing through the perforation hole. For example, the perforation parameters may include a count of the perforation hole of the perforation cluster, a diameter of the perforation hole, a density of the fracturing fluid, a type of the fracturing fluid, or the like.

In some embodiments, the processor may obtain the perforation parameters from a storage device or database. In some embodiments, the processor may also obtain the perforation parameters based on manual input.

The perforation friction resistance pressure drop is a loss of fracturing fluid pressure caused by frictional resistance of the perforation to the fracturing fluid.

In some embodiments, different locations of perforation clusters may correspond to different perforation friction resistance pressure drops.

The second predetermined algorithm refers to an algorithm for determining the perforation friction resistance pressure drop of the perforation cluster. For example, the second predetermined algorithm may be a predetermined formula or mapping relationship, etc.

In some embodiments, the second predetermined algorithm may be a friction resistance formula.

In some embodiments, for each perforation cluster, the processor may determine, based on the fracturing fluid flow velocity of the perforation cluster within each preset time period and the perforation parameter of the perforation cluster, the perforation friction resistance pressure drop of the perforation cluster within each preset time period by the second predetermined algorithm.

Merely by way of example, the second predetermined algorithm may be determined based on formula (5):

$$p_{p,i} = \frac{0.2369 Q_i^2 p}{n^2 d^4 c^2}; \quad (5)$$

Where $p_{p,i}$ denotes a perforation friction resistance pressure drop of an ith perforation cluster within a certain predetermined time period; $Q_i$ denotes a fracturing fluid flow rate of the ith perforation cluster within the predetermined time period, which may be determined based on the fracturing fluid flow velocity of the ith perforation cluster within the predetermined time period; p denotes a density of fracturing fluid; n denotes a count of perforation holes of the ith perforation cluster; d denotes a diameter of the perforation holes of the ith perforation cluster; and c denotes a perforation hole flow rate coefficient.

The perforation hole flow rate coefficient is used to characterize an effect of a perforation hole shape on the fracturing fluid pressure. In some embodiments, the perforation hole flow rate coefficient may be determined based on experimentation or experience.

In 240, slit fluid pressure data of the perforation cluster may be obtained.

The slit fluid pressure data is used to characterize a change in a slit fluid pressure over time. For example, the slit fluid pressure data may a sequence consisting of slit fluid pressures at different times.

In some embodiments, the slit fluid pressure data may be a sequence consisting of slit fluid pressures corresponding to different predetermined time periods.

The fracturing fluid pressure refers to a pressure value at which the fracturing fluid flows through an inlet location of a fracture slit.

The facture slit is a facture slit created by hydraulic fracturing construction at the location of the perforation cluster. In some embodiments, each perforation cluster may correspond to one fracture slit.

In some embodiments, the slit fluid pressure data of the fracture inlet of the perforation cluster may be determined based on the fracturing fluid flow velocity data of the perforation cluster.

In some embodiments, the processor may perform simulation by inputting the fracturing fluid flow rate of perforation cluster within each predetermined time period into a fracture slit extension model, and output a simulation results. In some embodiments, the processor may obtain the fracture slit extension model from a storage device or database.

The fracture slit extension model is a model for simulating a fracture slit during the fracturing construction process. For example, the fracture slit extension model may include graphical simulation software, data simulation software, or the like.

In some embodiments, the fracture slit extension model may include, but is not limited to, Perkins-Kern-Nordgren (PKN) model, Khristianovich-Geertsma-Daneshy (KGD) model, an elliptical model or the like.

The simulation result is an output result of fracture slit simulation during the fracturing construction process. In some embodiments, the simulation result may include a fracture slit morphological result and a fluid pressure at the fracture inlet of each perforation cluster within each predetermined time period. In some embodiments, the simulation result may be a numerical value or a visual image.

The fracture slit morphological result is a result of extended change in morphology of the fracture slit under the pressure of the fracturing fluid. For example, the fracture slit morphological result may include a fracture slit width, a location of a fracture slit boundary, or the like.

In some embodiments, the processor may determine slit fluid pressure data of each perforation cluster based on the fracturing fluid flow velocity data of each perforation cluster using the fracture slit extension model, the fracture slit extension model being a machine learning model.

In some embodiments, the processor may also be referred to as a first processor. The system for predicting the risk of early screen-out in the near-well zone based on DAS may further include a second processor. The first processor may send the fracturing fluid flow velocity data to the second processor to instruct the second processor to determine the slit fluid pressure data of the perforation cluster based on the fracturing fluid flow velocity data of the perforation cluster using the fracture slit extension model, and send the slit fluid pressure data of the perforation cluster to the first processor.

The second processor refers to a processing device deployed at a user terminal. The second processor may be configured to execute various models and present output results through a display interface of the user terminal. The user terminal refers to a device for interacting with a user. For example, the user terminal may include, but is not limited to, a tablet computer, a laptop computer, or the like. The user refers to a staff member of fracking construction, etc. The second processor allows the user to observe the output results more flexibly and intuitively, respond to the warning message in time, and improve the efficiency and quality of the fracturing construction.

The first processor may be configured to process various data and/or information. For example, the first processor may determine the fracturing fluid flow velocity data of the perforation cluster based on the location of the perforation cluster and the acoustic signal of the perforation cluster. As another example, the first processor may calculate the near-well friction resistance pressure drop of the perforation cluster based on the actual fluid pressure data, the perforation friction resistance pressure drop, the slit fluid pressure data, or the like.

The first processor may be deployed in a plurality of locations. For example, the first processor may be deployed in a server. As another example, the first processor may also be deployed in the user terminal. As another example, the first processor may be deployed at a location based on factors such as power supply and communication facilities at a fracturing construction site.

In some embodiments, when the construction site has stable power supply and good communication facilities, the first processor may be deployed in a processing device (e.g., the user terminal) on a surface of the well to be fractured, thereby reducing data transmission delay and response time, and allowing the user to quickly obtain the risk of early screen-out and respond to the warning message.

In some embodiments, in scenarios with low real-time data processing requirements, the first processor may be deployed in the server. The server may provide powerful computing and data processing capabilities, enabling remote monitoring and operation and improving the operation efficiency while reducing on-site equipment investment and maintenance costs.

The server is a platform that provides computing, networking, and storage capabilities based on the services of hardware resources and software resources. For example, the server may process sensor data, images, logs, and other data related to the fracturing construction process. In some embodiments, the server may be implemented on a cloud platform or provided virtually.

In some embodiments, the server may be remotely deployed. When the data is processed at the site of fracturing construction, the data processing may be affected by network stability and bandwidth limitation, which reduces the efficiency and accuracy of data processing. Therefore, deploying the remote server for data processing or storage may increase the computing resources of the system, avoid the influence of the environment of the construction site on data transmission, improve calculation accuracy, and provide more comprehensive remote management services to ensure the reliability and stability of system operation.

In some embodiments, other components (e.g., the first processor, the second processor, and the server) of the system for predicting the risk of early screen-out in the near-well zone based on DAS may be connected through a network for data communication, thereby realizing different functions, such as data processing, model training, model execution, or the like. For example, the first processor may send the fracturing fluid flow velocity data to the second processor. As another example, the first processor may send the data on historical hydraulic fracturing construction to the server. As another example, the server may train the fracture slit extension model based on the data of the historical hydraulic fracturing construction. As another example, the second processor may run the trained model using the slit fluid fracturing data and output the slit fluid pressure data and the fracture slit morphological result of the perforation cluster.

In some embodiments, the first processor may send the fracturing fluid flow velocity data of each perforation cluster to the second processor to instruct the second processor to run the trained fracture slit extension model based on the fracturing fluid flow velocity data of each the perforation cluster, output the slit fluid pressure data and the fracture slit morphological result of each cluster of the perforation cluster, and send the output results to the first processor.

In some embodiments, hardware costs and energy costs may be saved by deploying the model training in the server. In some embodiments, by deploying execution of the model on the second processor, the user may view the fracture slit morphological result and other data on any device, thereby improving flexibility and convenience of use.

In some embodiments, an input of fracture slit extension model may include the fracturing fluid flow velocity data of each perforation cluster in the well to be fractured, and a geological reservoir distribution of the well to be fractured, and an output of the fracture slit extension model may include the slit fluid pressure data and the fracture slit morphological result of each perforation cluster.

In some embodiments, the fracture slit extension model may be a sequence model. For example, the fracture slit extension model may be a recurrent neural network (RNN), a long short-term memory (LSTM) model, or the like.

In some embodiments, training of the fracture slit extension model may include two phases: initial training and enhanced training. The initial training refers to a process of training an initial model based on a pre-training set. The pre-training set is a large-scale dataset containing rich features and samples. The enhanced training refers to a process of fine-tuning parameters of a pre-trained model based on an enhanced dataset. The enhanced dataset is a scenario-specific dataset with a smaller amount of data relative to the pre-training set.

In some embodiments, the initial training and the enhanced training may be performed by one of the first processor, the server, and the second processor. For example, the initial training may be performed by the server, and the enhanced training may be performed by the second processor. Merely by way of, the server may determine the pre-training set based on data of a historical fracturing construction process, train an initial fracture slit extension model based on the pre-training set, and generate a pre-trained initial fracture slit extension model and send the pre-trained initial fracture slit extension model to the second processor. The second processor may obtain, based on the enhanced dataset, obtain a trained fracture slit extension model by performing the enhanced training on the parameters of the pre-trained initial fracture slit extension model.

The pre-trained fracture slit extension model may be suitable for many scenarios, and the fracture slit extension model dedicated to specific scenarios may be obtained by fine-tuning training in practical applications. For example, different construction sites may correspond to different scenarios of fracture slit extension model, which improves the applicability of the fracture slit extension model and the output accuracy of the fracture slit extension model.

In some embodiments, the server may obtain a pre-trained fracture slit extension model by performing the initial training on the fracture slit extension model using a large number of first training samples with first labels as the pre-training set. For example, a plurality of first training samples with the first labels may be input into the initial fracture slit extension model. A loss function may be constructed based on the first labels and prediction results of the initial fracture slit extension model. The initial fracture slit extension model may be iterative updated based on the loss function. When the loss function of the initial fracture slit extension model satisfies a predetermined condition, the pre-training of the fracture slit extension model may be completed. The predetermined condition may be that the loss function converges, a count of iterations reaches a threshold, or the like.

In some embodiments, the first processor may send fracturing construction data of a current construction site to the second processor as the enhanced dataset. The second processor may perform the enhanced training on the pre-trained initial fracture slit extension model based on the enhanced dataset.

In some embodiments, the first training samples with the first labels may be determined by one of the first processor, the server, and the second processor. For example, the first processor may upload data of the historical fracturing construction process to the server, and the server may determine the first training samples with the first labels based on the data of the historical fracturing construction process. By determining the first training samples with the first labels by the server, the first processor can be relieved of computational pressure, and a large and abundant number of first training samples with the first labels can be obtained, thereby improving the training effect of the fracture slit extension model.

In some embodiments, the first training samples may include sample fracturing fluid flow velocity data of each sample perforation cluster of a sample well to be fractured, and a geological reservoir distribution of the sample well to be fractured. The first labels may be historical slit fluid pressure data of the sample perforation cluster of the sample well to be fractured, and a historical fracture slit morphological result. The first labels may be obtained based on manual or processor labeling.

In some embodiments, the historical fracture slit morphological result may be determined based on measurement of a historical perforation cluster, a prediction result of a fracture slit model, or the like.

In some embodiments, the first processor may obtain the historical slit fluid pressure data of the perforation cluster by analyzing and processing, based on a software simulation or using various data analysis algorithms, for example, regression analysis, etc., locations and spacings of perforations, fracturing fluid parameters, fracturing parameters, and geologic conditions.

In some embodiments of the present disclosure, the slit fluid pressure data can be efficiently and accurately predicted and estimated through the fracture slit extension model, which is conducive to subsequent determination of the suitable actual fluid pressure data. The training of the data processing model, and the model execution are respectively performed by the first processor, the server, and the second processor, realizing multi-terminal interaction, which can improve the efficiency of system computing, and improve the stability and safety of the system. The system can be maintained and repaired in the future by different functions of the component.

In 250, actual fluid pressure data of the location of the perforation cluster in the well to be fractured may be determined based on the pressure monitoring data and wellbore friction resistance.

The actual fluid pressure data is used to characterize a change in actual fluid pressure over time.

In some embodiments, the actual fluid pressure data may be a sequence consisting of actual fluid pressures at different times. In some embodiments, the actual fluid pressure data may be a sequence consisting of actual fluid pressures within different predetermined time periods.

The actual fluid pressure is an actual pressure value of the fracturing fluid when fracturing fluid flows through the location of the perforation cluster.

The wellbore friction resistance is a frictional resistance generated by the fracturing fluid when the fracturing fluid moves relative to a tubing wall or other objects in the wellbore.

In some embodiments, different locations of perforation clusters may correspond to different wellbore friction resistance.

In some embodiments, the processor may obtain the wellbore friction resistance by reading stored data, calling a related interface, or otherwise (e.g., an on-way friction pressure drop equation).

In some embodiments, for each perforation cluster, the processor may calculate a difference between a pressure monitoring value at a certain time and wellbore friction resistance at the location of the perforation cluster based on pressure monitoring data of the perforation cluster as the actual fluid pressure at the location of the cluster. The processor may combine the actual fluid pressures at the location of the perforation cluster at different times as the actual fluid pressure data at the location of the perforation cluster.

In some embodiments, for each perforation cluster, the processor may calculate, based on the pressure monitoring data of the perforation cluster, a difference between an average value of the pressure monitoring value within a predetermined time period and the wellbore friction resistance at the location of the perforation cluster as the actual fluid pressure at the location of the perforation cluster within the predetermined time period. The processor may combine the actual fluid pressures at the location of the perforation cluster within different predetermined time periods as the actual fluid pressure data at the location of the perforation cluster.

In 260, the near-well friction resistance pressure drop of the perforation cluster may be determined based on the actual fluid pressure data, the perforation friction resistance pressure drop, and the slit fluid pressure data.

The near-well friction resistance pressure drop refers to frictional resistance to the fracturing fluid in a near-well region due to fracture bends, inconsistent borehole phases, and multiple fracture slits.

The near-well region is a geographic extent within a predetermined distance of the perforation cluster of the wellbore. In some embodiments, the near-well region may be a geographic extent of a regular shape (e.g., a circle, a rectangle, a triangle, etc.) or an irregular shape (e.g., an irregular polygon). Merely by way of example, the near-well region may be a circular region with the current perforation cluster as a center of circle and a predetermined distance as a radius.

In some embodiments, different locations of perforation clusters may correspond to different near-well friction resistance pressure drops.

In some embodiments, for each perforation cluster, the processor may determine, based on the actual fluid pressure, the perforation friction resistance pressure drop, and the slit fluid pressure of the perforation cluster within a certain predetermined time period, the near-well friction resistance pressure drop of the perforation cluster within the certain predetermined time period based on a first predetermined rule.

Merely by way of example, the first predetermined rule may be that the larger the perforation friction resistance pressure drop of the perforation cluster within the predetermined time period, the larger the slit fluid pressure, and the lower the actual fluid pressure, the lower the near-well friction resistance pressure drop.

In some embodiments, the processor may determine the near-well friction resistance pressure drop of the perforation cluster based on a difference value obtained by subtracting the perforation friction resistance pressure drop and the slit fluid pressure data from the actual fluid pressure data.

In some embodiments, for each perforation cluster, the processor may take a result obtained by subtracting the perforation friction resistance pressure drop and the slit fluid pressure from the actual fluid pressure of the perforation cluster within the predetermined time period as the near-well friction resistance pressure drop of the perforation cluster within the predetermined time period.

Merely by way of example, the processor may determine the near-well friction resistance pressure drop of the perforation cluster based on equation (6):

$$p_{n,i} = p_{r,i} - p_{p,i} - p_{f,i}; \quad (6)$$

Where $p_{n,i}$ denotes a near-well friction resistance pressure drop of an ith perforation cluster within a certain predetermined time period; $p_{r,i}$ denotes an actual fluid pressure at the location of the ith perforation cluster within the predetermined time period; $p_{f,i}$ denotes a slit fluid pressure of the ith perforation cluster within the predetermined time period, and $p_{p,i}$ denotes a perforation friction resistance pressure drop of the ith perforation cluster within the predetermined time period.

In some embodiments of the present disclosure, by calculating the difference between the actual fluid pressure, and the perforation friction resistance pressure drop and the slit fluid pressure, a reasonable near-well friction resistance pressure drop can be quickly determined, thereby improving the efficiency of calculation.

In 270, a near-well friction resistance coefficient of the perforation cluster may be determined based on the near-well friction resistance pressure drop of the perforation cluster.

The near-well friction resistance coefficient is used to reflect a connectivity in near-well zone of a fracture slit corresponding to the perforation cluster in the near-well region. The larger the near-well friction resistance coefficient, the more severe the fracture slit is twisted in the near-well region, and the smaller an effective width of the fracture slit.

In some embodiments, different durations of predetermined time periods and different predetermined time periods may correspond to different near-well friction resistance coefficients.

In some embodiments, for each perforation cluster, the processor may determine, based on the near-well friction resistance pressure drop of the perforation cluster within a certain predetermined time period, the near-well friction resistance coefficient of the perforation cluster within the predetermined time period by a second predetermined rule. Merely by way of example, the second predetermined rule may be that the greater the near-well friction resistance pressure drop of the perforation cluster within the certain predetermined time period, the greater the near-well friction resistance coefficient.

In some embodiments, the processor may determine the near-well friction resistance coefficient of the perforation cluster based on the near-well friction resistance pressure drop of the perforation cluster, and the fracturing fluid flow velocity data of the fracture slit of the perforation cluster.

In some embodiments, for each perforation cluster, the processor may determine the near-well friction resistance coefficient of the perforation cluster within a certain predetermined time period based on the near-well friction resistance pressure drop of the perforation cluster within the predetermined time period and a fracturing fluid-flow rate ratio.

Merely by way of example, the processor may determine the near-well friction resistance coefficient of the perforation cluster based on equation (7):

$$\alpha = \frac{p_{n,i}}{\sqrt{q_i}}; \quad (7)$$

Where $\alpha$ denotes a near-well friction resistance coefficient of an ith perforation cluster within a certain predetermined time period, $p_{n,i}$ denotes a near-well friction resistance coefficient of the ith perforation cluster within the predetermined time period, and $q_i$ denotes a fracturing fluid flow rate of the ith perforation cluster within the predetermined time period.

In some embodiments of the present disclosure, the effect of the fracturing fluid pressure in the near-well region can be quantified by the near-well friction resistance pressure drop of the perforation cluster, and the fracturing fluid-flow rate ratio of the fracture slit of the perforation cluster, which is beneficial for subsequent determination of the risk of early screen-out in the near-well zone.

In 280, it may be determined whether the perforation cluster has the risk of early screen-out in the near-well zone based on the near-well friction resistance coefficient.

The risk of early screen-out in near-well zone is a probability that a proppant plugs the fracture slit. For example, the risk of early screen-out in the near-well zone may include presence of the risk of early screen-out in the near-well zone, and no risk of early screen-out in the near-well zone. In some embodiments, whether there is the risk of early screen-out in the near-well zone may be indicated by a numerical value of 0 or 1. When the numerical value is 1, it may indicate that there is presence of the risk of early screen-out in the near-well zone; and when the numerical value is 0, it may indicate that there is no risk of early screen-out in the near-well zone.

In some embodiments, the processor may determine the risk of early screen-out in the near-well zone of each perforation cluster based on the near-well friction resistance coefficient of each perforation cluster within different predetermined time periods in various ways. For example, for each perforation cluster, the processor may determine, based on a change in the near-well friction resistance coefficient of the perforation cluster within different predetermined time periods, a change trend (e.g., an increase or a decrease, etc.) in the near-well friction resistance coefficient to determine the risk of early screen-out in the near-well zone. Merely by way of example, if the near-well friction resistance coefficient of the perforation cluster increases, the risk of early screen-out in the near-well zone of the fracture slit of the perforation cluster may be determined; and if the near-well friction resistance coefficient of the perforation cluster decreases, no risk of early screen-out in the near-well zone of the fracture slit of the perforation cluster may be determined.

In some embodiments, for each perforation cluster, the processor may be configured to: in response to a determination that the near-well friction resistance coefficient of the perforation cluster satisfies a first predetermined condition, determine that the fracture slit of the perforation cluster has no risk of early screen-out in the near-well zone; in response to a determination that the near-well friction resistance coefficient of the perforation cluster satisfies a second predetermined condition, determine that the perforation cluster has the risk of early screen-out in the near-well zone; in response to a determination that the perforation cluster has the risk of early screen-out in the near-well zone and a flow rate of the perforation cluster satisfies a third predetermined condition, determine that the fracture slit of the perforation cluster has the early screen-out in near-well zone, and determine a first treatment scheme; and in response to a determination that a count of perforation clusters having the early screen-out in the near-well zone satisfies a predetermined count requirement, determine a second treatment scheme.

The first predetermined condition refers to a determination condition for assessing the risk of early screen-out in the near-well zone.

In some embodiments, the first predetermined condition may include a first condition, and a second condition.

The first condition refers to a determination condition for determining whether the proppant is smoothly transported within the fracture slit in case of no risk of early screen-out in the near-well zone. For example, the first condition may include a fluctuating trend in the near-well friction resistance coefficient within a time period, and a magnitude of increase or decrease may be less than a threshold. The threshold may be determined based on manual or experimental determination. The fluctuating trend refers to a repeated upward and downward trend of the near-well friction resistance coefficient as time increases.

The upward trend refers to an increase in the near-well friction resistance coefficient with time within a time period. The downward trend refers to a decrease in the near-well friction resistance coefficient with time within a time period.

In some embodiments, the processor may calculate a differential value of the near-well friction resistance coefficient within each predetermined time period in a chronological order to determine whether the near-well friction resistance coefficient is fluctuating, increasing, or decreasing. For example, when the differential value of each near-well friction resistance coefficient within a time period is greater than zero, it means an upward trend in the near-well friction resistance coefficient; and when the differential value of each near-well friction resistance coefficient within a time period is less than zero, it means a downward trend in the near-well friction resistance coefficient.

When the near-well friction resistance coefficient satisfies the first condition, it means that the proppant in the near-well region is smoothly transported with no risk of early screen-out.

The second condition is a determination condition for assessing whether an effective width of the fracture slit increases in case of no risk of early screen-out in the near-well zone. For example, the second condition may include a change trend of increase in the near-well friction resistance coefficient within a time period.

When the near-well friction resistance coefficient satisfies the second condition, it means that the near-well region is effectively eroded by the sand-carrying fluid, a fracture tortuosity decreases, the effective width of the fracture slit increases, and there is currently no risk of early screen-out for the time being.

The effective width of the fracture slit refers to an actual width of the fracture slit.

The second predetermined condition refers to a determination condition for assessing the risk of early screen-out in the near-well zone. For example, the second predetermined condition may include a downward trend in the near-well friction resistance coefficient within a time period.

When the near-well friction resistance coefficient satisfies the second predetermined condition, it means that the near-well region is gradually built up by the proppant, the connectivity in near-well zone of the fracturing fluid decreases, and the fracture slit of the perforation cluster has the risk of early screen-out in the near-well zone.

The third predetermined condition refers to a determination condition for assessing occurrence of the early screen-out in the near-well zone. For example, the third predetermined condition may include a downward trend in the fracturing fluid flow rate of the perforation cluster within a time period, and the fracturing fluid flow rate of the perforation cluster decreases at a rate greater than a rate threshold. The rate threshold may be determined based on manual or experimental determination.

The preset count refers to a preset parameter value. The preset count may be a manual preset value, a system default value, or determined according to an actual construction situation.

The first treatment scheme refers to information related treatment of a perforation cluster having the early screen-out in the near-well zone. For example, the first treatment scheme may include shifting the fracture slit of the perforation cluster for temporary plug, lowering the fracturing fluid-sand ratio of the perforation cluster, or the like, or any combination thereof.

In some embodiments, when the early screen-out in the near-well zone occurs, the processor may determine the first treatment scheme from a plurality of treatment schemes satisfying the second predetermined condition in the historical data by random selection.

The second treatment scheme refers to information related to treatment of a plurality of perforation clusters having the early screen-out in the near-well zone, and second treatment scheme is configured to solve the early screen-out in the near-well zone. For example, the second treatment scheme may include reducing the fracturing fluid-sand ratio, stopping pumping proppant, or the like, or any combination thereof.

In some embodiments, when a count of the perforation clusters having early screen-out in the near-well zone satisfies a predetermined count, the processor may determine the first treatment scheme from a plurality of treatment schemes satisfying the third predetermined condition in the historical data by random selection.

In some embodiments of the present disclosure, by analyzing the change trend of the near-well friction resistance coefficient, the risk of early screen-out in the near-well zone can be effectively determined, thereby improving the sand filling efficiency and the construction safety and the quality and effectiveness of fracturing by determining the treatment scheme.

In 290, in response to a determination that the perforation cluster has the risk of early screen-out in the near-well zone, a warning message may be generated and sent to a user terminal.

The warning message is a message related to an abnormal condition during the fracturing construction process. For example, the warning message may include the risk of early screen-out in the near-well zone, the occurrence of the early screen-out in the near-well zone, etc.

In some embodiments, the processor may send the warning message to the user terminal based on a form of text, voice, image, video, tactile alert, etc., or any combination thereof.

In some embodiments, the processor may output the warning message indicating the risk of early screen-out in the near-well zone and the occurrence of the early screen-out in the near-well zone by voice prompting; or the processor may control the user terminal to output the contents of the treatment scheme by image prompting. An image prompting message may include a picture, a video, or the like, and may be displayed on a current interface of the user terminal.

In some embodiments, the processor may generate the warning message based on the risk of early screen-out in the near-well zone and send the warning message to the user terminal.

In some embodiments of the present disclosure, monitoring the acoustic signal based on the distributed optical fiber acoustic sensors is conducive to improving the determination accuracy of the flow rate of the perforation cluster, and reducing the error of the fracture slit morphological result predicted by the fracture extension model. The near-well friction resistance coefficient, which is difficult to obtain by traditional methods, is estimated by combining the monitoring data and theoretical calculations, and the risk of early screen-out in the near-well zone is dynamically assessed based on the change of the near-well friction resistance coefficient, which improves the determination objectivity, accuracy, and practicability of the risk of early screen-out in the near-well zone, and provides a more flexible, efficient, and economical solution for the management of risk of early screen-out for the on-site operator.

It should be noted that the foregoing description of the process is for the purpose of exemplification and illustration only and does not limit the scope of application of the present disclosure. For those skilled in the art, various corrections and changes to the process may be made under the guidance of the present disclosure. However, such corrections and changes remain within the scope of the present disclosure.

Figure 3:
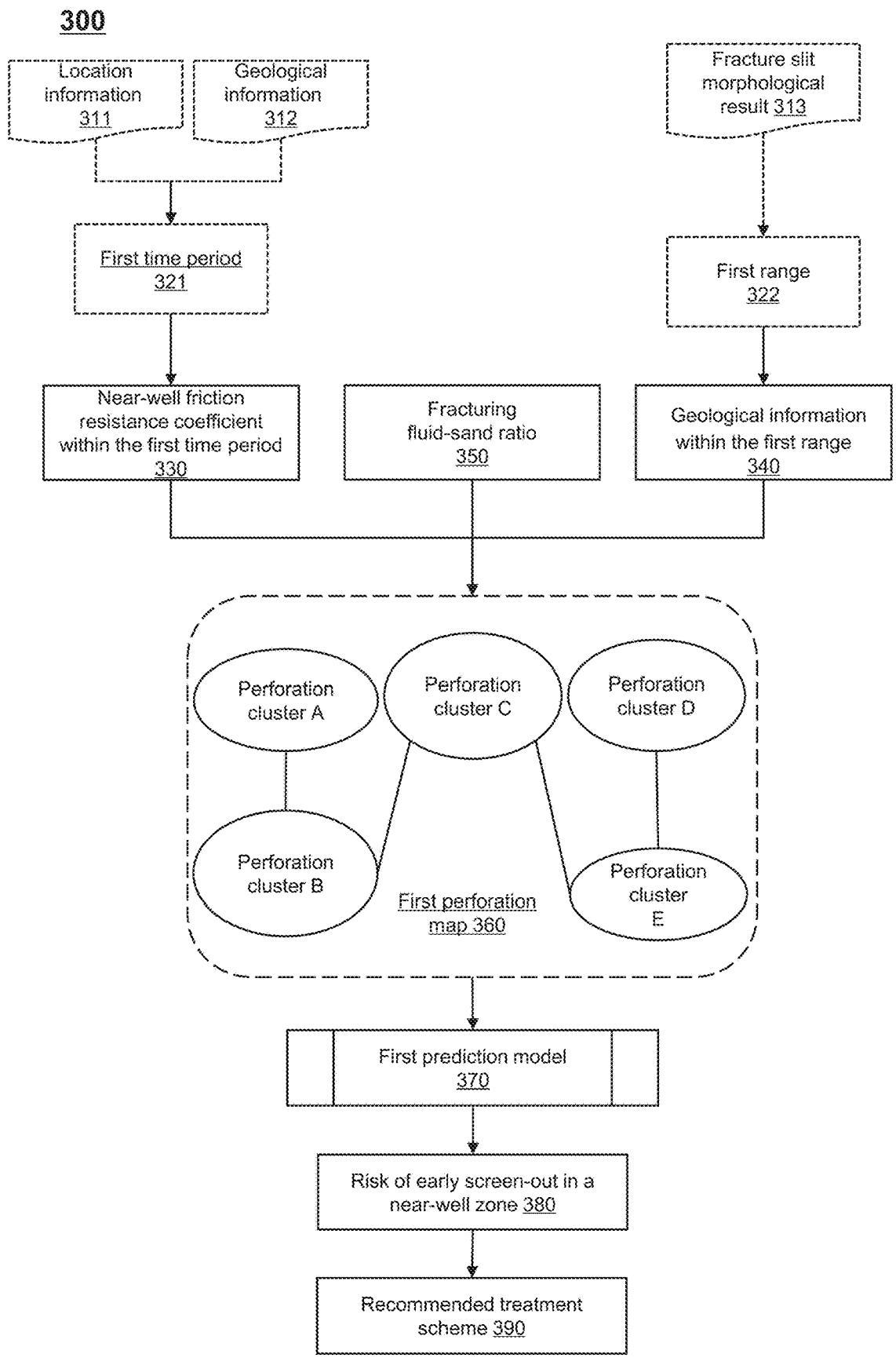
FIG. 3 is a schematic diagram illustrating an exemplary first prediction mode according to some embodiments of the present disclosure.

FIG. 3 is a schematic diagram illustrating an exemplary first prediction model according to some embodiments of the present disclosure.

In some embodiments, the processor may determine, based on a near-well friction resistance coefficient 330 of each perforation cluster within a first time period, geological information 340 within a first range, and a fracturing fluid-sand ratio 350, a risk of early screen-out in a near-well zone 380 of each perforation cluster by a first prediction model 370; and determine, based on the risk of early screen-out in near-well zone 380 of each perforation cluster, a recommended treatment scheme 390 for the perforation cluster.

More descriptions regarding the near-well friction resistance coefficient 330 may be found in the related depictions of FIG. 2.

The first prediction model 370 is a model for predicting a risk of early screen-out in a near-well zone for each perforation cluster.

The first prediction model 370 is a model for treatment of the risk of early screen-out in the near-well zone 380. In some embodiments, the first prediction model 370 may be a machine learning model. For example, the first prediction model 370 may be a neural network model. As another example, the first prediction model 370 may be a graph neural network (GNN) model, a convolutional neural networks (CNN) model, or the like, or any combination thereof.

In some embodiments, an input of the first prediction model 370 may include the near-well friction resistance coefficient 330 of each perforation cluster within a first time period, the geological information 340 within the first range, and the fracturing fluid-sand ratio 350; and an output of the first prediction model 370 may include the risk of early screen-out in the near-well zone 380 of each perforation cluster.

In some embodiments, the input data may be data features of the perforation cluster represented by a first perforation map in a graphical sense, and data features of a relationship between the perforation clusters.

The risk of early screen-out in the near-well zone 380 is information reflecting the risk of early screen-out in the near-well zone of the perforation cluster. For example, the risk of near-well sand plug 380 may include the risk of early screen-out in the near-well zone of the perforation cluster, a time of the risk of early screen-out in the near-well zone, or the like.

In some embodiments, in response to a determination that the perforation cluster has no early screen-out at a current time, the time of the risk of early screen-out in the near-well zone may be a predicted future time; and in response to a determination that the perforation cluster has early screen-out at the current time, the time of the risk of early screen-out in the near-well zone may be a value such as zero or a default value.

A first perforation map 360 refers to a map configured to characterize the relationship between the perforation clusters. In some embodiments, the first perforation map 360 may be a data structure including nodes and edges. The edges may connect the nodes, and the nodes and the edges may have features.

In some embodiments, each node of the first perforation map 360 may output the risk of early screen-out in the near-well zone 380 based on the first perforation map 360 by the first prediction model 370.

The nodes may correspond to the perforation clusters. Node features may reflect information related to the perforation clusters. For example, the node features may include the near-well friction resistance coefficient 330 of the perforation cluster within the first time period, the geological information 340 of the perforation cluster within the first range, the fracturing fluid-sand ratio 350, or the like.

The first time period is a predetermined long time range. For example, the first time period may be a day, a week, a month, etc. In some embodiments, the first time period refers to a time period including one or more predetermined time periods.

In some embodiments, the first time period may be a system default value, an empirical value, a manually preset value, or the like, or any combination thereof, and may also be set according to actual needs.

The near-well friction resistance coefficient 330 of the perforation cluster within the first time period may be a sequence consisting of the near-well friction resistance coefficients 330 within different predetermined time periods of the first time period.

The geological information is data reflecting geological features of a perforation cluster to be fractured. For example, the geological information may include information on a geologic structure, a rock type, a porosity, a pore structure, seepage features, and a geologic distribution of reservoirs of the well to be fractured.

The rock type may include sandstone, shale, mudstone, etc.

In some embodiments, the processor may obtain, based on geologic samples of the perforation cluster within the first range, the geological information 340 of the perforation cluster within the first range in various ways. For example, the processor may determine the geological information 340 of the perforation cluster within the first range by analyzing the geologic samples based on a near-well seismic technique, a core scanning analysis technique, etc.

The first range is a near-well region of the perforation cluster in the wellbore.

In some embodiments, the first range refers to a system default value, an empirical value, a manually preset value, or the like, or any combination thereof, and may also be set according to actual needs.

The edges may correspond to the perforation clusters. For example, two adjacent perforation clusters in the wellbore may have edges between them, and a flow direction of the fracturing fluid between the two adjacent perforation clusters may be a direction of the edges. The edge features may reflect location information 311 between the two adjacent perforation clusters. For example, the edge features may include a distance between the two adjacent perforation clusters.

The node features and the edge features may be determined in various ways based on fracturing construction data. The ways are those illustrated in the above embodiments and may be other ways. The fracturing construction data may include current data or historical data.

In some embodiments, the edges have directions, and the nodes may have outgoing and/or incoming edges. The incoming edge is an edge pointing to the node, and the outgoing edge is an edge pointing to another node from the node.

In some embodiments, the first perforation map 360 may be constructed by one of a first processor, a server, and a second processor. For example, the first processor may send the near-well friction resistance coefficient 330 of each perforation cluster within the first time period, the geological information 340 within the first range, and the fracturing fluid-sand ratio 350 to the second processor. The second processor may construct the first perforation map 360 based on the data.

By constructing the first perforation map 360 by the second processor, the computational pressure of the first processor can be relieved, the transmission delay can be avoided, direct transmission of the map structure can be avoided, and the amount of data transmission is small, which is conducive to obtaining the accurate and efficient first perforation map 360, and improving the output accuracy of the first prediction model 370.

In some embodiments, the first processor may also directly construct the first perforation map 360 based on the near-well friction resistance coefficient 330 of each perforation cluster within the first time period, the geological information 340 within the first range, and the fracturing fluid-sand ratio 350.

In some embodiments, the processor may determine a first time period 321 of the perforation cluster based on the location information 311, and geological information 312 of the perforation cluster.

The location information 311 of the perforation cluster is a distance relationship between the perforation cluster and a vertical well. The shorter the distance between the perforation cluster and the vertical well, the more upstream the location of the perforation cluster in the well to be fractured (which may be referred to hereinafter as an upstream perforation cluster); and the farther the distance between the perforation cluster and the vertical well, the more downstream the location of the perforation cluster in the well to be fractured (which may be referred to hereinafter as a downstream perforation cluster).

The upstream perforation cluster and the downstream perforation cluster may be related to a direction of fracturing fluid transportation. For example, the upstream perforation cluster may be a perforation cluster on the wellbore through which the fracturing fluid is transported prior to transportation of the fracturing fluid to a particular perforation cluster, and the downstream perforation cluster may be a perforation cluster on the wellbore through which the fracturing fluid is transported after transportation of the fracturing fluid to the particular perforation cluster.

Considering the perforation clusters at different locations in the wellbore, flow rates, pressures, and flow velocities of the fracturing fluid may be different, which leads to differences in a change in the near-well friction resistance coefficient 330. The smaller the change in the near-well friction resistance coefficient 330 of the perforation cluster, the longer the first time period 321 needed to analyze to the near-well friction resistance coefficient 330.

Probabilities of early screen-out in the near-well zone may vary for different geological formations. For example, formations with high sand content and brittle formations with high porosity may have a relatively high probability of early screen-out in the near-well zone. Accordingly, the change in the near-well friction resistance coefficient 330 of the geological formation may be obtained in a relatively short first time period 321. For other geological formations, the probability of early screen-out in the near-well zone may be relatively small. Therefore, the near-well friction resistance coefficient 330 of the geological formation needs to be analyzed in a relatively long first time period 321.

In some embodiments, the processor may determine a probability of early screen-out in the near-well zone of various types of geological information 312 and determine a grade of early screen-out in the near-well zone of the geological information 312 by analyzing the various types of geological information 312, or any combination thereof based on the historical data. Different probabilities of early screen-out in the near-well zone may correspond to different grades of early screen-out in the near-well zone. The higher the grade of early screen-out in the near-well zone, the higher the probability of early screen-out in the near-well zone in this geological formation.

In some embodiments, the processor may acquire historical data of candidate perforation clusters, and screen historical near-well friction resistance coefficients 330 of the candidate perforation clusters prior to early screen-out as target data; and determine a historical time when a decrease magnitude of the historical near-well friction resistance coefficients 330 in the target data is greater than a magnitude threshold, and determine a time period from the historical time to a time of early screen-out as the first time period 321.

The candidate perforation clusters are the geological information 312 have a low probability of early screen-out in the near-well zone.

In some embodiments, the processor may also determine the first time period 321 of the perforation cluster based on the location information 311 of the perforation cluster and the geological information 312 by vector matching, modeling, or various data analysis algorithms, such as regression analysis.

It should be noted that for oil and gas reservoirs with relatively high geological complexity or relatively high production intensity, the risk of early screen-out in the near-well zone may be relatively high, which requires more frequent monitoring and high-precision prediction. While for oil and gas reservoirs with relatively stable geological environment and better production conditions, the risk of early screen-out may be relatively low, and the monitoring frequency may be appropriately reduced to lower the cost.

In some embodiments of the present disclosure, the first time period may be determined based on the location information of the perforation cluster and the geological information, and data of different durations may be obtained for analysis for the perforation cluster at different locations and with different geologies, which is conducive to improving the calculation efficiency and saving storage resources of the system.

In some embodiments, the processor may determine the first range 322 of the perforation cluster based on a fracture slit morphological result 313. The fracture slit morphological result 313 may be determined based on a fracture slit extension model. The fracture slit extension model may be a machine learning model.

More descriptions regarding the fracture slit morphological result 313 may be found in the related descriptions of FIG. 2.

In some embodiments, the fracture slit morphological result 313 may also include a length of a main fracture slit. The main fracture slit is a fracture slit having a largest volume relative to other fracture slits.

In some embodiments, the length of the main fracture slit may reflect a size of the fracture slit of the perforation cluster. For example, the longer the length of the main fracture slit, the greater the extent of the fracture slit; and the shorter the length of the main fracture slit, the smaller the extent of the fracture slit.

The extent of the fracture slit refers to a sum of volumes of the main fracture slit and other branch fracture slits.

In some embodiments, the processor may preset a correspondence table between different lengths of main fracture slits and different first ranges 322 and determine the first range 322 of the perforation cluster by looking up the table.

The first range 322 may be configured to determine a range of the geological information of the perforation cluster. Different ranges of fracture slits may correspond to different first ranges 322.

In some embodiments, the processor may also determine the first range 322 based on a product of the length of the main fracture slit and a predetermined coefficient. The predetermined coefficient is a predetermined parameter value.

In some embodiments of the present disclosure, determining the first range of the perforation cluster based on the fracture slit morphological result may reduce the amount of input data of the geological information, thereby improving the prediction efficiency of the first prediction model 370 while ensuring the accuracy of the predicted risk of early screen-out in the near-well zone of the perforation cluster.

In some embodiments, the first prediction model 370 may be obtained based on data training. The training data may include second training samples and second labels. For example, the second training samples may include a sample first perforation map, and the second labels may be whether a sample perforation cluster corresponding to a node has actual early screen-out in the near-well zone, and a time of the early screen-out in the near-well zone. The nodes of the sample first perforation profile and node features, edges and edge features may be similar to those described above. The second training samples may be determined based on historical data, and the second labels may be determined by the processor or manual labeling.

In some embodiments, the second training samples and the second labels may be determined by one of the first processor, the server, and the second processor. For example, the first processor may upload data of a historical fracturing construction process to the server, and the server may construct the sample first perforation map based on the data of the historical fracturing construction process and label the corresponding labels to obtain the second training samples and the second labels. By constructing the sample first perforation map and completing labeling of corresponding sample data by the server, the computational pressure of the first processor and the second processor can be alleviated, and abundant second training samples and second labels can be obtained, thereby improving the training effect of the first prediction model 370.

In some embodiments, the first prediction model 370 may be trained by the server based on the second training samples and the second labels. In some embodiments, the trained first prediction model 370 may be sent to the second processor by the server. Correspondingly, the first processor may send the first perforation map 360 to the second processor to instruct the second processor to run the first prediction model 370 based on the first perforation map 360 to output the predicted risk of early screen-out in the near-well zone 380 of the perforation cluster, and send the risk of early screen-out in the near-well zone 380 of the perforation cluster to the first processor.

In some embodiments, initial training and enhanced training may be performed on the first prediction model 370 based on a manner similar to FIG. 2. The initial training and the enhanced training may be performed by one of the first processor, the server, and the second processor. For example, the initial training may be performed by the server, and the enhanced training may be performed by the second processor.

The recommended treatment scheme refers to information related treatment of the perforation cluster having the risk of early screen-out in the near-well zone. Different locations of perforation clusters having the risk of early screen-out in the near-well zone may corresponding to different recommended treatment schemes. The information related to treatment may include, but is not limited to, shifting plug of the fracture slit of the perforation cluster, reducing the fracturing fluid-sand ratio of the perforation cluster, stopping pumping the proppant, or the like, any combination thereof.

In some embodiments, the processor may determine the recommended treatment scheme 390 based on the risk of early screen-out in the near-well zone 380 of the perforation cluster based on a comparison table of the recommended treatment scheme 390. The comparison table of the recommended treatment scheme 390 may store recommended treatment schemes 390 corresponding to risks of early screen-out in the near-well zone 380 for different perforation clusters.

In some embodiments, the processor may also send the risk of early screen-out in the near-well zone 380 of the perforation cluster to a user terminal for display, obtain input from the user, and determine the recommended treatment scheme 390 for the perforation cluster.

In some embodiments of the present disclosure, the risk of early screen-out in the near-well zone of the perforation cluster can be efficiently and accurately determined by the first prediction model, which is conducive to developing a reasonable treatment scheme, and improving on-site early screen-out of the fracturing construction.

Figure 4:
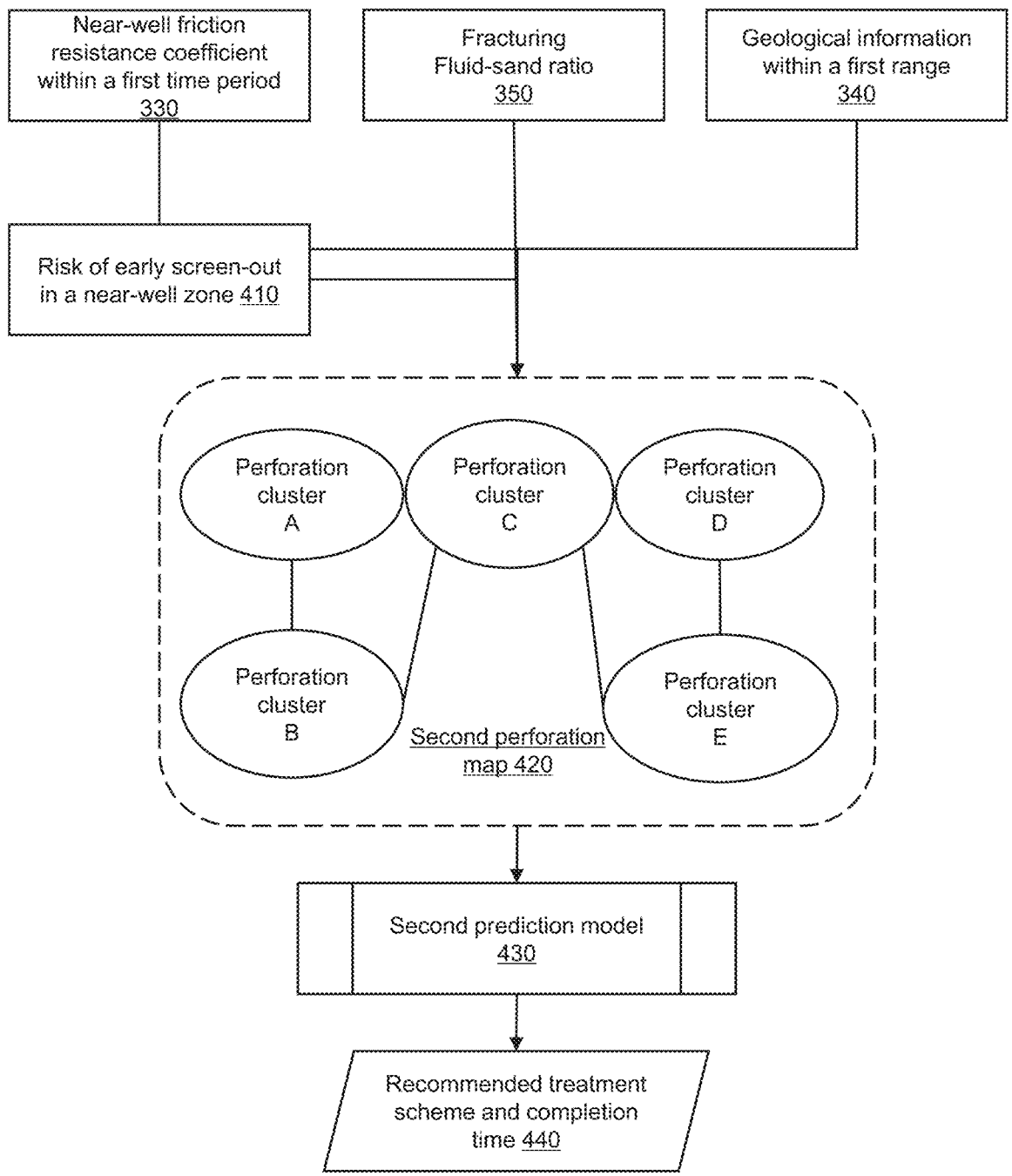
FIG. 4 is a schematic diagram illustrating an exemplary second prediction mode according to some embodiments of the present disclosure.

FIG. 4 is a schematic diagram illustrating an exemplary second prediction model according to some embodiments of the present disclosure.

In some embodiments, the processor may determine, based on a risk of early screen-out in a near-well zone 410 of each perforation cluster, a recommended treatment scheme and completion time 440 by a second prediction model 430.

More descriptions regarding the risk of the early screen-out in the near-well zone 410, and the recommended treatment scheme may be found in the related depictions of FIG. 3.

The second prediction model 430 is a model configured to determine the recommended treatment scheme and the completion time.

In some embodiments, the second prediction model 430 may be a graph neural network (GNN) model or another graph model, such as a graph convolutional neural network (GCNN) model, etc.

In some embodiments, an input of the second prediction model 430 may include a second perforation map 420. Nodes of the second perforation map 420 may output the recommended treatment scheme, a treatment sequence, and the completion time of the perforation cluster having the risk of early screen-out in the near-well zone.

The nodes and node features, edges and edge features of the second perforation map 420 may be similar to those of the first shotgun map.

In some embodiments, the node features may also include the risk of early screen-out in the near-well zone 410 corresponding to each node.

In some embodiments, the second perforation map 420 may be constructed by one of the first processor, the server, and the second processor. For example, the first processor may send the near-well friction resistance coefficient 330 of each perforation cluster within the first time period, the geological information 340 within the first range, the fracturing fluid-sand ratio 350, and the risk of early screen-out in the near-well zone 410 to the second processor, and the second processor may construct the second perforation map 420 based on the data.

By constructing the second perforation map 420 by the second processor, the computational pressure of the first processor may be relieved, direct transmission of the map structure may be avoided, and the amount of data transmission is relatively small, which is conducive to obtaining the accurate and efficient second perforation map 420 and improving the output accuracy of the second prediction model 430.

In some embodiments, the first processor may also directly construct the second perforation map 420 based on the near-well friction resistance coefficient 330 of the perforation cluster within the first time period, the geological information 340 within the first range, the fracturing fluid-sand ratio 350, and the risk of early screen-out in the near-well zone 410.

The nodes that are treated first may affect the nodes that are treated later. By a sequence relationship between the nodes through which the fracturing fluid flows and a distance relationship between the nodes in the second perforation map 420, reasonable recommended treatment schemes and a treatment sequence of each recommended treatment scheme may be determined.

The treatment sequence refers to an order of treatment of the recommended processing programs of each perforation cluster. In some embodiments, the treatment sequence may include a starting time of the recommended processing program.

In some embodiments, the recommended treatment regimen may include temporary plug shifting, adjusting fracturing parameters (e.g., the flow rate, the pressure, a fracturing fluid-sand ratio of fracturing fluid), and a corresponding magnitude of adjustment, adding chemicals to dissolve the sand, or the like.

The completion time is time required for complete the recommended treatment scheme. The completion time may be affected by the treatment sequence of the recommended treatment scheme. The recommended treatment scheme carried out first may either positively or negatively affect the risk of early screen-out in the near-well zone of an untreated perforation cluster, and thus the completion time of the recommended treatment scheme may be different for each perforation cluster.

In some embodiments, when multiple perforation clusters have the risk of early screen-out in the near-well zone, different locations of perforation clusters having the risk of early screen-out in the near-well zone may correspond to different recommended treatment schemes and treatment sequences.

In some embodiments, the treatment sequence of the recommended treatment scheme may be determined based on a positional relationship between the perforation clusters and a type of recommended treatment scheme. For example, a treatment object may be downstream perforation cluster, and the recommended treatment scheme may be at least one of temporary plug shifting and reducing the fracturing fluid-sand ratio. In a process of treating the downstream perforation cluster, when the fracturing fluid of which the fracturing fluid-sand ratio is reduced flows though the upstream perforation cluster, the early screen-out in the near-well zone of the upstream perforation cluster may be alleviated, thereby saving the treatment time of the early screen-out and improving the treatment efficiency.

In some embodiments, the second prediction model 430 may be trained based on third training samples and third labels in a manner similar to training the first prediction model to obtain the trained second prediction model 430.

In some embodiments, the third training samples and the third labels may be determined by one of the first processor, the server, and the second processor. For example, the first processor may upload data of a historical fracturing construction process to the server, the server may construct a sample second perforation map based on the data of the historical fracturing construction process and label the labels to obtain the third training samples and the third labels. By constructing the sample second perforation map and completing the labeling of the corresponding sample data by the server, the computational pressure of the first processor and the second processor can be alleviated, and abundant third training samples and third labels can be obtained, thereby improving the training effect of the second prediction model 430.

In some embodiments, the second prediction model 430 may be trained by the server based on the third training samples and the third labels. In some embodiments, the trained second prediction model 430 may be sent to the second processor. Correspondingly, the first processor may send the second perforation map to the second processor to instruct the second processor to run the second prediction model 430 based on the second perforation map to output the recommended treatment scheme for each node having the risk of early screen-out in the near-well zone, the treatment sequence, and the completion time, and send output results to the first processor.

In some embodiments, initial training and enhanced training may be performed on the second prediction model 430 based on a manner similar to that of FIG. 2. The initial training and the enhanced training may be performed by one of the first processor, the server, the second processor. For example, the initial training may be performed by the server, and the enhanced training may be performed by the second processor.

In some embodiments of the present disclosure, a plurality of perforation clusters may have the risk of early screen-out in the near-well zone or have the early screen-out in the near-well zone. Due to the varying conditions of each perforation cluster, each perforation cluster may be treated. Time and resources can be saved by determining the reasonable recommended treatment scheme and the treatment sequence.

In some embodiments, the pressure monitoring data may also be referred to as construction pressure monitoring data, and monitoring construction pressure data; the signal energy distribution may also be referred to as acoustic signal energy value change data; the signal energy distribution range may also be referred to as acoustic signal energy value distribution range; the fracture slit may also be referred to as a hydraulic fracture slit, and the slit fluid pressure may also be referred to as a hydraulic fracture slit fluid pressure; and the slit extension model may also be referred to as a numerical model for calculating the fracture extension of the horizontal well fracture slit.

More descriptions regarding the pressure monitoring data, the signal energy distribution range, the slit fluid pressure, and the fracture slit extension model may be found in the related depictions of FIG. 2.

The method for predicting the risk of early screen-out in the near-well zone based on DAS may comprise the following operations.

In S10, distributed optical fibers may be laid in a well to be fractured by a continuous tubing technology and installed on an outer side of a production casing or an outer side of a packer tubing column.

In S20, geological and engineering parameters of a reservoir of the well to be fractured may be collected and organized.

In S30: segmented multi-cluster fracturing construction operation of the well to be fractured may be performed, acoustic signals during the fracturing process may be transmitted through optical fibers and the acoustic signals may be processed as variations in energy values over time; and construction pressure monitoring data may also be collected.

In S40, a distribution range of acoustic signal energy values corresponding to the locations of the perforation clusters of the horizontal well may be calibrated based on depths of the perforation clusters and the change data of the acoustic wave signal energy values determined in the construction design.

In S50, a sum of all energy values within the distribution range of the acoustic signal energy values of the locations of the perforation clusters within each time period may be calculated based on every 10 seconds as a time period, and the acoustic energy of each perforation cluster within the time period may be obtained.

In S60, corrected sound energy may be obtained by processing data curves of variations of the sound energy of each perforation cluster within a historical time period using a specific weighted moving average filter.

In S70, a fracturing fluid flow velocity of each perforation cluster within the time period may be calculated based on the corrected sound energy.

In S80, a perforation friction resistance pressure drop of each perforation cluster may be calculated using an existing reasonable friction resistance formula based on the calculated fracturing fluid flow velocity of each perforation cluster and perforation parameters of each perforation cluster.

In S90: the fracturing fluid flow velocity of each perforation cluster calculated in S70 may be substituted into any reasonable numerical model for calculating fracture extension of horizontal well fracturing to simulate and predict further extension behaviors and morphological changes of the hydraulic fracture slit and output a predicted fracture slit morphological result and the slit fluid pressure of the hydraulic fracture of each perforation cluster; and an actual fluid pressure of each perforation cluster at the bottom of the well may be determined based on the monitoring construction pressure data and wellbore friction resistance, and a near-well friction resistance pressure drop of the hydraulic fracture slit of each perforation cluster may be calculated.

In S100, a near-well friction resistance coefficient of each perforation cluster may be calculated based on the near-well friction resistance pressure drop of the hydraulic fracture slit of each perforation cluster.

In S110: the risk of early screen-out in the near-well zone may be determined based on a change rule of the near-well friction resistance coefficient over time.

In some embodiments, the formula for calculating the corrected sound energy in S60 is represented by:

$$T_i^{t+1} = \frac{3S_i^t + 3S_i^{t-1} + 3S_i^{t-2}}{3+2+1};$$

Where $T_i^{t+1}$ denotes corrected sound energy in J of an ith perforation cluster within a (t+1)th time period, $S_i^t$ denotes sound energy in J of the ith perforation cluster within a t time period, $S_i^{t-1}$ denotes sound energy in J of the ith perforation cluster within a (t−1)th time period, and $S_i^{t-2}$ denotes the sound energy in J of the ith perforation cluster within a (t−2)th time period.

In some embodiments, the formula for calculating the fracturing fluid flow velocity of each perforation cluster in S70 is represented by:

$$\frac{q_j}{q_k} = \frac{T_j}{T_k}, j, k \in 1, 2, \ldots N;$$

$$q_1 + q_2 + q_3 + \ldots + q_N = Q;$$

$$q_i = \frac{T_i Q}{T_1 + T_2 + \ldots + T_{N-1} + T_N}, i = 1, 2, 3, \ldots N;$$

Where $q_i$ denotes the fracturing fluid flow velocity of the ith perforation cluster in m³/s, $q_j$ denotes a fracturing fluid flow velocity of a jth perforation cluster in m³/s, $T_j$ denotes corrected sound energy of the jth perforation cluster with a unit of J, $T_k$ denotes corrected sound energy of a kth perforation cluster in J, N denotes a dimensionless count of perforation clusters in the fracturing segment, Q denotes a total fracturing fluid displacement in m3/s, and T denotes the corrected sound energy with a unit of J.

In some embodiments, the formula for calculating the near-well friction resistance pressure drop of the hydraulic fracture slit of each perforation cluster in S90 is represented by:

$$p_{n,i} = p_{r,i} - p_{p,i} - p_{f,i};$$

Where $p_{n,i}$ denotes a near-well friction resistance pressure drop of an ith perforation cluster in MPa; $p_{r,i}$ denotes an actual fluid pressure at the location of the ith perforation cluster of cluster in MPa; and $p_{f,i}$ denotes a slit fluid pressure of the ith perforation cluster in MPa.

In some embodiments, the formula for calculating the near-well friction resistance coefficient of each perforation cluster in S100 is represented by:

$$\alpha = \frac{p_{n,i}}{\sqrt{q_i}};$$

Where $\alpha$ denotes a near-well friction resistance coefficient of the ith perforation cluster in MPa·s$^{0.5}$/m$^{1.5}$.

In some embodiments, the specific determination process in S110 is represented as follows.

When the near-well friction resistance coefficient of the ith perforation cluster is relatively stable or fluctuates up and down with time during a fracturing process, it may be considered that a proppant is smoothly transported in the near-well region of the fracture slit of the ith perforation cluster with no risk of early screen-out in the near-well zone for the time being.

During the fracturing process, when the near-well friction resistance coefficient of the ith perforation cluster starts to decrease gradually with time, it may be considered that the near-well region of the fracture slit of the ith perforation cluster is eroded by the sand-carrying fluid substantially, and a fracture twist decreases, and an effective width of the fracture slit increases with no risk of early screen-out in the near-well zone for the time being.

During the fracturing process, when the near-well friction resistance coefficient of the ith perforation cluster starts to increase continuously with time, it may be considered that the near-well region of the fracture slit of the ith perforation cluster is gradually built up by the proppant, and the connectivity in near-well zone of the fracturing fluid for passing through the region decreases, and the fracture slit has a clear risk of early screen-out in the near-well zone; when the flow velocity of the ith perforation cluster decreases rapidly, occurrence of the early screen-out in the near-well zone is determined; and the early screen-out in the near-well zone in part of the fracture slit may be improved by temporary plugging shifting and reducing the fracturing fluid-sand ratio.

If the early screen-out in the near-well zone occurs in most fracture slits of the perforation clusters within the fracture segment, it may indicate a significant risk of early screen-out incident. In this case, the sand ratio may be reduced or even the proppant pumping may be stopped to remove the early screen-out in the near-well zone.

In some embodiments, taking fracturing of segment 4 of a shale gas well S2 in Sichuan in conjunction with DAS monitoring as an example, the method for predicting the risk of early screen-out in the near-well zone based on DAS may include the following operations.

In S10, distributed optical fibers may be installed on an outer side of a production casing, and the distributed optical fibers may be laid in the shale gas well S2 by the continuous tubing technology.

In S20, geological and engineering parameters of a reservoir of the shale gas well S2 may be collected and organized.

In S30: construction operation of multi-stage hydraulic fracturing of the shale gas well S2 in multiple clusters may be performed, and acoustic signals during the fracturing process may be transmitted through optical fibers and the acoustic signals may be processed as variations in energy values (squared values of measured values of original signals) with time; and construction pressure monitoring data may be collected.

In S40, a distribution range of acoustic signal energy values corresponding to locations of perforation clusters of the horizontal well may be calibrated based on depths of the perforation clusters and change data of the acoustic signal energy values determined in the construction design.

Figure 5:
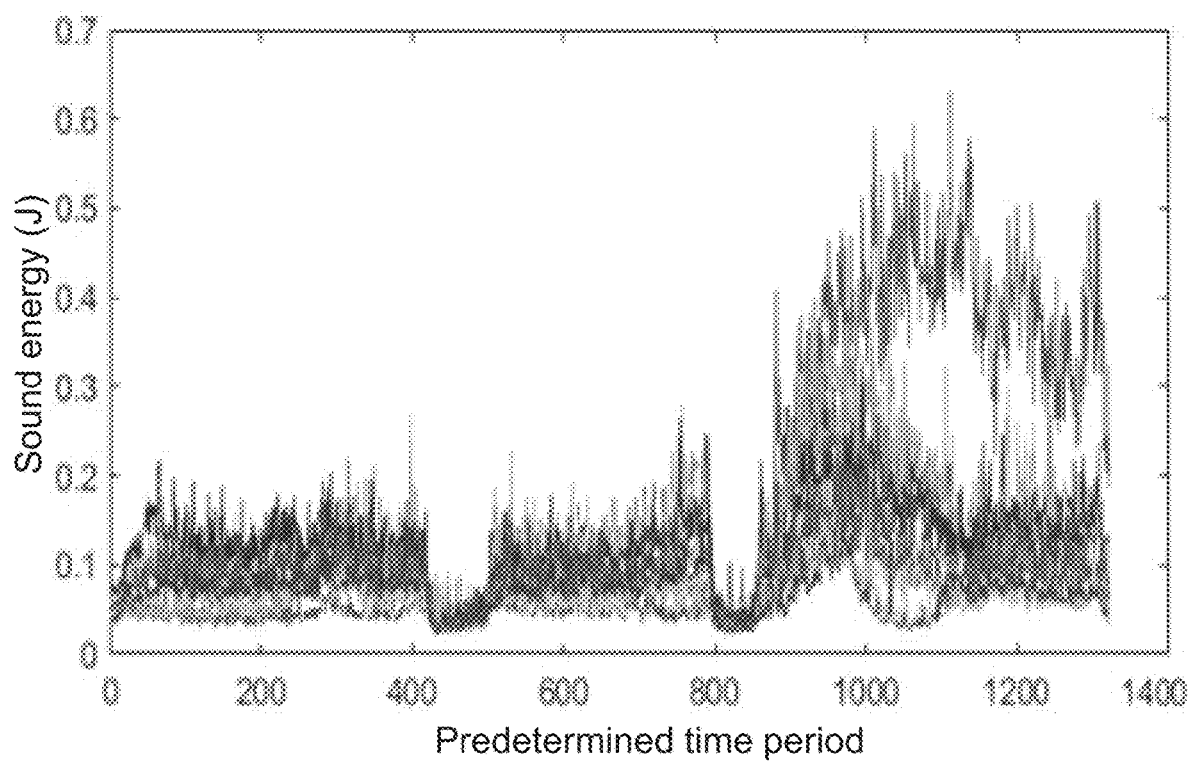
FIG. 5 is a schematic diagram illustrating an exemplary sound energy curve according to some embodiments of the present disclosure.

In S50, sound energy of each perforation cluster within the time period may be obtained by calculating a sum of all the energy values within the distribution range of the acoustic signal energy values of the locations of the perforation clusters within each time period. FIG. 5 is a schematic diagram illustrating an exemplary sound energy curve according to some embodiments of the present disclosure.

A sound energy curve may be configured to characterize sound energy corresponding to different predetermined time periods.

Horizontal coordinates in FIG. 5 may represent different predetermined time periods, e.g., a 0th predetermined time period, and a 200th predetermined time period. Vertical coordinates may represent sound energies (J) corresponding to different predetermined time periods.

Figure 6:
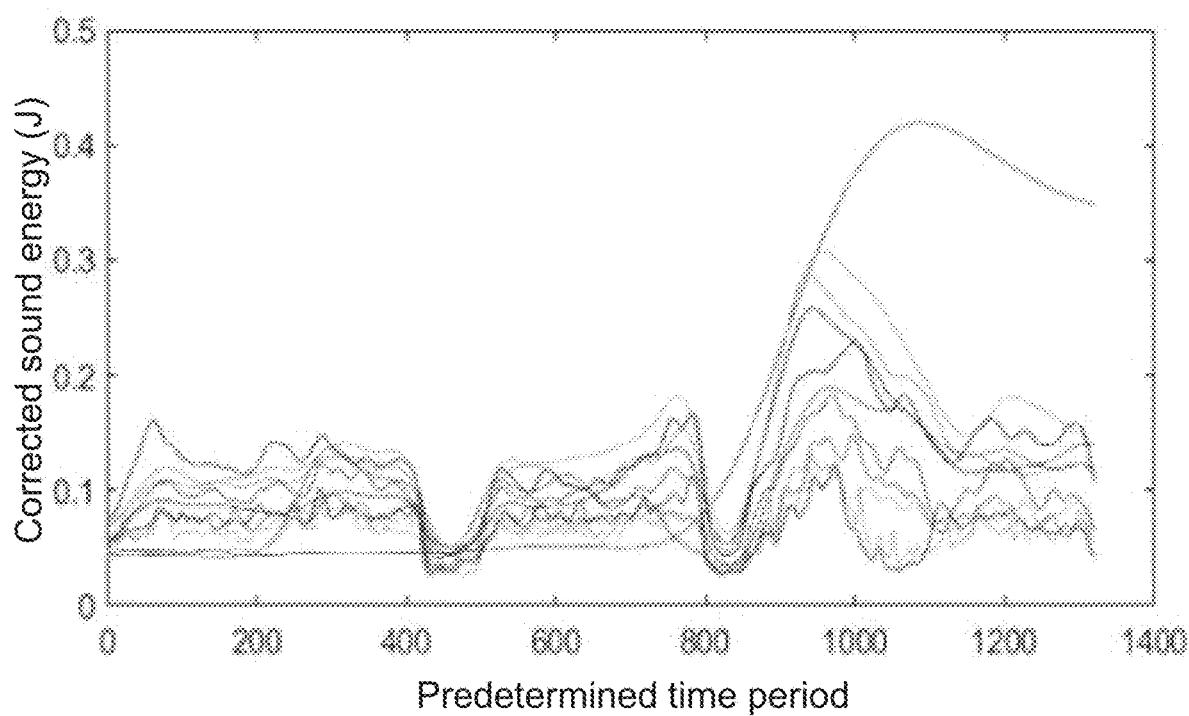
FIG. 6 is a schematic diagram illustrating an exemplary corrected sound energy curve according to some embodiments of the present disclosure.

In S60, corrected sound energy may be calculated by processing data curves of variations of the sound energy of each perforation cluster within a historical time period (a plurality of historical time periods) based on a weighted moving average filter of formula (1), as shown in FIG. 6. FIG. 6 is a schematic diagram illustrating a corrected sound energy curve according to some embodiments of the present disclosure.

The corrected sound energy curve may be configured to characterize the corrected sound energy corresponding to different predetermined time periods.

Horizontal coordinates in FIG. 6 may represent different predetermined time periods, e.g., a 0th predetermined time period, and a 200th predetermined time period. Vertical coordinates may represent corrected sound energies (in J) corresponding to different predetermined time periods.

Figure 7:
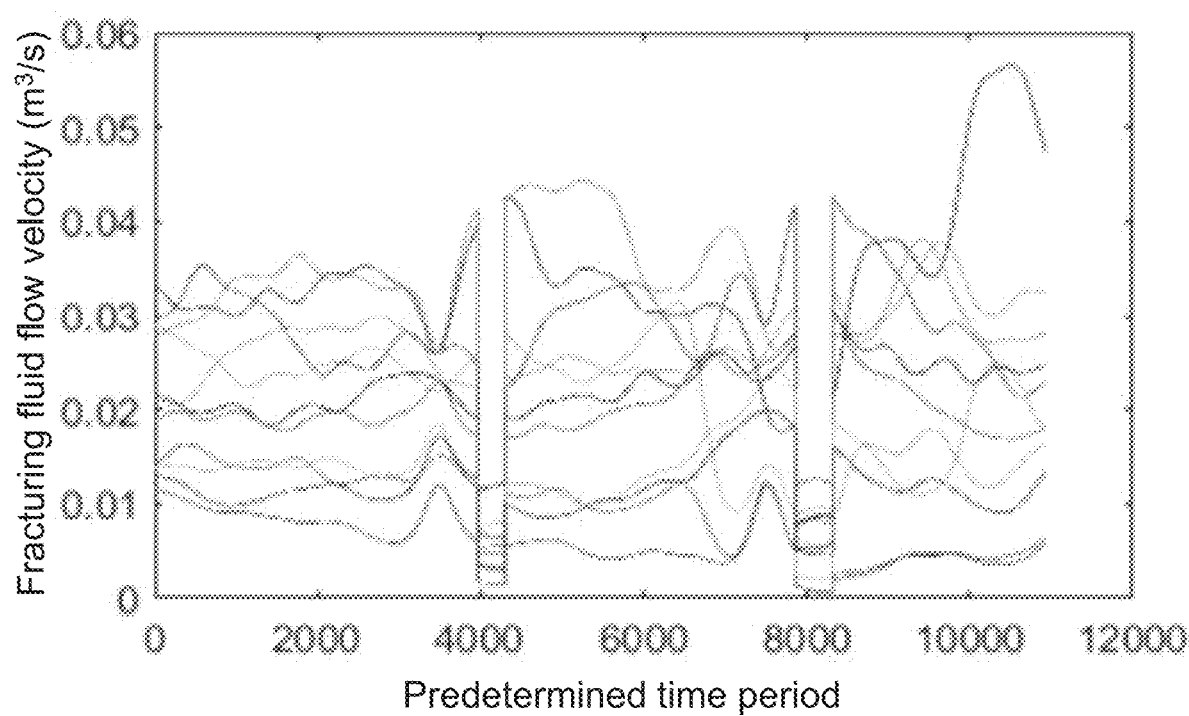
FIG. 7 is a schematic diagram illustrating an exemplary fracturing fluid flow velocity curve according to some embodiments of the present disclosure.

In S70, a change rule of the fracturing fluid flow velocity of each perforation cluster with time may be calculated, as shown in FIG. 7. FIG. 7 is a schematic diagram illustrating an exemplary fracturing fluid flow velocity curve according to some embodiments of the present disclosure.

The fracturing fluid flow velocity may be configured to characterize fracturing fluid flow velocities corresponding to different predetermined time periods.

Horizontal coordinates in FIG. 7 may represent different predetermined time periods, such as, a 0th predetermined time period and a 200th predetermined time period. Vertical coordinates may represent the fracturing fluid flow velocities (in $m^3/s$) corresponding to different predetermined time periods.

In S80, a perforation friction resistance pressure drop of each perforation cluster may be calculated according to formula (5) based on the calculated fracturing fluid flow velocity of each perforation cluster and the perforation parameters of each perforation cluster.

Figure 8:
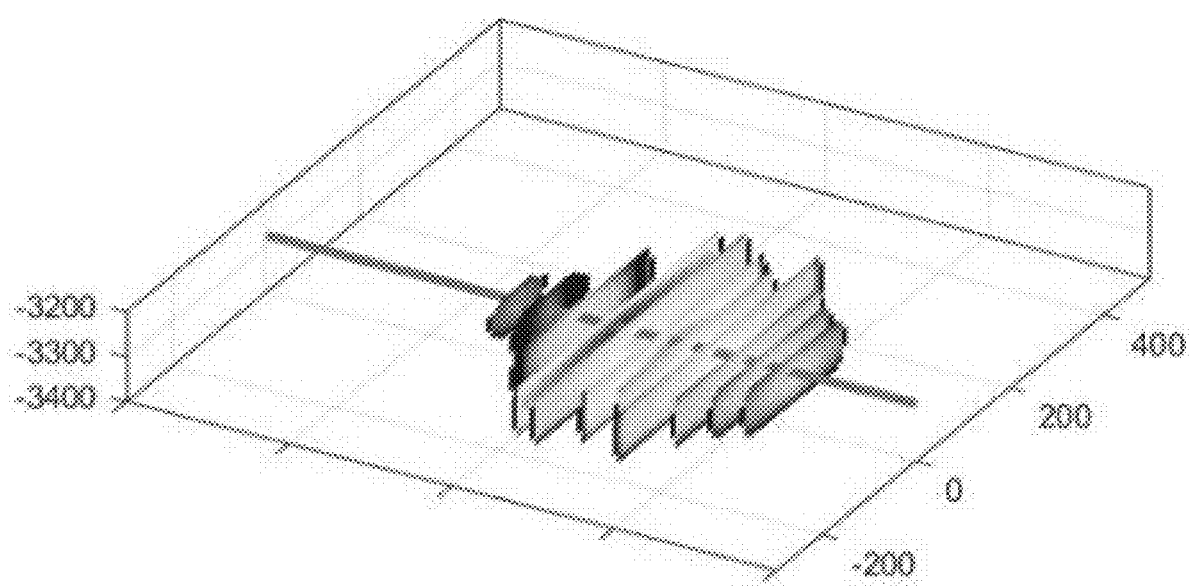
FIG. 8 is a schematic diagram illustrating an exemplar fracture slit morphological result according to some embodiments of the present disclosure.

In S90: the fracturing fluid flow velocity of each perforation cluster may be substituted into any reasonable numerical model for calculating the fracture extension of a horizontal well fracture to simulated and predict the further extension behavior and the morphological change of the hydraulic fracture slit, and output a predicted fracture slit morphological result and the slit fluid pressure of the hydraulic fracture slit of each perforation cluster; and an actual fluid pressure at each perforation cluster at the bottom of the well may be calculated based on monitoring construction pressure data and wellbore friction resistance, and the near-well friction resistance pressure drop of each perforation cluster may be calculated. FIG. 8 is a schematic illustration illustrating an exemplary fracture slit morphological result according to some embodiments of the present disclosure.

The fracture slit morphological result may be configured to characterize an extension behavior and a morphological changes of the fracture slit of the perforation cluster in the reservoir.

Merely by way of example, 810 in FIG. 8 represents the fracture slit morphological result of a certain perforation cluster in a fourth fracturing segment. The perforation cluster may include 11 clusters.

In S100, a near-well friction resistance coefficient of each perforation cluster may be calculated based on the near-well friction resistance pressure drop of the hydraulic fracture slit of each perforation cluster.

In S110: the risk of early screen-out in the near-well zone of the cluster may be determined based on the change rule of the near-well friction resistance coefficient of each perforation cluster over time.

When the near-well friction resistance coefficients of the perforation clusters 6-7 and 10-11 are relatively stable or fluctuate over time during the fracturing process, the proppant may be smoothly transported in the near-well regions of the fracture slits of the perforation clusters 6, 7, 10, and 11 with no risk of early screen-out in the near-well zone.

During the fracturing process, the near-well friction resistance coefficients of the perforation clusters 4-5 and 8-10 decrease significantly, and it may be determined that the near-well regions of the fractures of the clusters are significantly eroded by the sand-carrying fluids, and effective widths of the slits increase with no risk of early screen-out in the near-well zone.

The near-well friction resistance coefficients of the perforation clusters 1-3 continue to increase with time, and the near-well regions of the fracture slits of the first 3 perforation clusters are gradually built up by the proppant, producing an obvious warning signal of early screen-out in the near-well zone. The temporary plug shifting operation using temporary plugging balls during the fracturing process ultimately succeeds in improving the development of the fracture slits of the third perforation cluster.

One or more embodiments of the present disclosure further provide a device for predicting a risk of early screen-out in the near-well zone based on DAS. The device may comprise a processor configured to execute a method for predicting a risk of early screen-out in the near-well zone based on DAS as described in any of the preceding embodiments.

One or more embodiments of the present disclosure further provide a non-transitory computer-readable storage medium comprising computer instructions that, when read by a computer, may direct the computer to execute a method for predicting a risk of early screen-out in the near-well zone based on DAS as described in any of the preceding embodiments.

The basic concept has been described above. Obviously, for those skilled in the art, the above detailed disclosure is only an example, and does not constitute a limitation to the present disclosure. Although not expressly stated here, those skilled in the art may make various modifications, improvements and corrections to the present disclosure. Such modifications, improvements and corrections are suggested in this disclosure, so such modifications, improvements and corrections still belong to the spirit and scope of the exemplary embodiments of the present disclosure.

Meanwhile, the present disclosure uses specific words to describe the embodiments of the present disclosure. For example, "one embodiment", "an embodiment", and/or "some embodiments" refer to a certain feature, structure or characteristic related to at least one embodiment of the present disclosure. Therefore, it should be emphasized and noted that references to "one embodiment" or "an embodiment" or "an alternative embodiment" two or more times in different places in the present disclosure do not necessarily refer to the same embodiment. In addition, certain features, structures or characteristics in one or more embodiments of the present disclosure may be properly combined.

In addition, unless clearly stated in the claims, the sequence of processing elements and sequences described in the present disclosure, the use of counts and letters, or the use of other names are not used to limit the sequence of processes and methods in the present disclosure. While the foregoing disclosure has discussed by way of various examples some embodiments of the invention that are presently believed to be useful, it should be understood that such detail is for illustrative purposes only and that the appended claims are not limited to the disclosed embodiments, but rather, the claims are intended to cover all modifications and equivalent combinations that fall within the spirit and scope of the embodiments of the present disclosure. For example, although the implementation of various components described above may be embodied in a hardware device, it may also be implemented as a software only solution, e.g., an installation on an existing server or mobile device.

In the same way, it should be noted that in order to simplify the expression disclosed in this disclosure and help the understanding of one or more embodiments of the invention, in the foregoing description of the embodiments of the present disclosure, sometimes multiple features are combined into one embodiment, drawings or descriptions thereof. This method of disclosure does not, however, imply that the subject matter of the disclosure requires more features than are recited in the claims. Rather, claimed subject matter may lie in less than all features of a single foregoing disclosed embodiment.

In some embodiments, counts describing the quantity of components and attributes are used. It should be understood that such counts used in the description of the embodiments use the modifiers "about", "approximately" or "substantially" in some examples. Unless otherwise stated, "about", "approximately" or "substantially" indicates that the stated figure allows for a variation of ±20%. Accordingly, in some embodiments, the numerical parameters used in the disclosure and claims are approximations that can vary depending upon the desired characteristics of individual embodiments. In some embodiments, numerical parameters should consider the specified significant digits and adopt the general digit retention method. Although the numerical ranges and parameters used in some embodiments of the present disclosure to confirm the breadth of the range are approximations, in specific embodiments, such numerical values are set as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for predicting a risk of early screen-out in a near-well zone based on distributed fiber acoustic sensing (DAS), comprising the following operations:

S10, laying distributed optical fibers in a horizontal well to be fractured with coiled tubing, and installing the distributed optical fibers on an outer side of a production casing or an outer side of a packer tubing column;

S20, collecting geological and engineering parameters of a reservoir of the horizontal well to be fractured, and adopting a numerical model, wherein the numerical model includes a Perkins-Kern-Nordgren (PKN) model, a Khristianovich-Geertsma-Daneshy (KGD) model, and an elliptical model, for calculating a fracture propagation in the horizontal well;

S30, performing construction operation of multi-stage hydraulic fracturing of a shale gas well S2 in multiple clusters, and transmitting acoustic signals during the fracturing process through the optical fibers, and processing the acoustic signals as variations in energy values with time; and collecting construction pressure monitoring data;

S40, calibrating a distribution range of acoustic signal energy values corresponding to locations of perforation clusters of the horizontal well based on depths of the perforation clusters and change data of the acoustic signal energy values determined in a construction design;

S50, obtaining sound energy of each perforation cluster within a time period by calculating a sum of all the energy values within the distribution range of the acoustic signal energy values of the locations of the perforation clusters within each time period;

S60, obtaining corrected sound energy by processing data curves of variations of the sound energy of each perforation cluster within a historical time period using a specific weighted moving average filter;

S70, calculating a fracturing fluid flow velocity of each perforation cluster within the time period based on the corrected sound energy;

S80, calculating a perforation friction pressure drop of each perforation cluster using an existing friction formula based on the calculated fracturing fluid flow velocity of each perforation cluster and perforation parameters of each perforation cluster;

S90, substituting the fracturing fluid flow velocity of each perforation cluster calculated in the S70 into the numerical model for calculating the fracture extension of the horizontal well fracturing slit to simulate and predict further extension behaviors and morphological changes of the hydraulic fracture slit and output a predicted fracture slit morphological result and the slit fluid pressure of the hydraulic fracture of each perforation cluster; determining an actual fluid pressure of each perforation cluster at a bottom of the well based on the monitoring construction pressure data and wellbore friction resistance; and calculating a near-well friction resistance pressure drop of the hydraulic fracture slit of each perforation cluster;

$$p_{n,i} = p_{r,i} - p_{p,i} - p_{f,i}$$

where $p_{n,i}$ denotes a near-well friction resistance pressure drop of an ith fracture slit in MPa; $p_{r,i}$ denotes an actual fluid pressure at the location of the ith perforation cluster in MPa; $p_{p,i}$ denotes a perforation friction pressure drop of the ith perforation cluster in MPa within a certain predetermined time period; and $p_{f,i}$ denotes a fluid pressure of the ith fracture slit in MPa;

S100, calculating a near-well friction resistance coefficient of the fracture of each perforation cluster based on the near-well friction resistance pressure drop of the hydraulic fracture slit of each perforation cluster; and S110, determining the risk of early screen-out in the near-well zone based on a change rule of the near-well friction resistance coefficient over time.

2. The method of claim 1, wherein the formula for calculating the corrected sound energy in the S60 is represented by:

$$T_i^{t+1} = \frac{3S_i^t + 3S_i^{t-1} + 3S_i^{t-2}}{3 + 2 + 1}$$

where $T_i^{t+1}$ denotes a corrected sound energy in J of an ith perforation cluster within a (t+1)th time period; $S_i^t$ denotes a sound energy in J of the ith perforation cluster within a t time period; $S_i^{t-1}$e denotes a sound energy in J of the ith perforation cluster within a (t−1)th time period; and $S_i^{t-2}$ denotes a sound energy in J of the ith perforation cluster within a (t−2)th time period.

3. The method of claim 2, wherein the formula for calculating the fracturing fluid flow velocity of each perforation cluster in the S70 is represented by:

$$\frac{q_j}{q_k} = \frac{T_j}{T_k}, j, k \in 1, 2, \ldots N;$$

$$q_1 + q_2 + q_3 + \ldots + q_N = Q;$$

$$q_i = \frac{T_i Q}{T_1 + T_2 + \ldots + T_{N-1} + T_N}, i = 1, 2, 3, \ldots N;$$

where $q_i$ denotes a fracturing fluid flow velocity of the ith perforation cluster in m³/s; $q_k$ denotes a fracturing fluid flow velocity of the kth perforation cluster in m³/s; $q_j$ denotes a fracturing fluid flow velocity of a jth perforation cluster in m³/s; $T_j$ denotes a corrected sound energy of the jth perforation cluster in J; $T_k$ denotes a corrected sound energy of a kth perforation cluster in J; N denotes a dimensionless count of perforation clusters in the fracturing segment; Q denotes a total fracturing fluid displacement in m³/s; and T denotes the corrected sound energy in J.

4. The method of claim 1, wherein the formula for calculating the near-well friction resistance coefficient of each perforation cluster in the S100 is represented by:

$$\alpha = \frac{p_{n,i}}{\sqrt{q_i}}$$

where $\alpha$ denotes the near-well friction resistance coefficient of the ith perforation cluster in MPa·s$^{0.5}$/m$^{1.5}$; $q_i$ denotes a fracturing fluid flow velocity of the ith fracture slit in m³/s; $p_{n,i}$ denotes the near-well friction resistance pressure drop of the ith fracture slit in MPa.

5. The method of claim 1, wherein a specific determination process in the S110 includes:
when the near-well friction resistance coefficient of the ith perforation cluster is relatively stable or fluctuates up and down with time during a fracturing process, considering that a proppant is smoothly transported in the near-well region of the fracture slit of the ith perforation cluster with no risk of early screen-out in the near-well zone for the time being;
during the fracturing process, when the near-well friction resistance coefficient of the ith perforation cluster starts to decrease gradually with time, considering that the near-well region of the fracture slit of the ith perforation cluster is eroded by sand-carrying fluid substantially, a fracture twist decreases, and an effective width of the fracture slit increases with no risk of early screen-out in the near-well zone for the time being;
during the fracturing process, when the near-well friction resistance coefficient of the ith perforation cluster starts to increase continuously with time, considering that the near-well region of the fracture slit of the ith perforation cluster is gradually built up by the proppant, a connectivity in near-well zone of the fracturing fluid for passing through the region decreases, and the fracture slit has a clear risk of early screen-out in the near-well zone; when the flow velocity of the ith perforation cluster decreases rapidly, determining occurrence of the early screen-out in the near-well zone; and improving the early screen-out in the near-well zone in part of the fracture slit by temporary plugging shifting and reducing the fracturing fluid-sand ratio; and
if the early screen-out in the near-well zone occurs in most fracture slits of the perforation clusters within the fracture segment, indicating a significant risk of early screen-out incident, in this case, reducing the sand ratio or even stopping proppant pumping to remove the early screen-out in the near-well zone.

* * * * *